United States Patent
Homchaudhuri et al.

(10) Patent No.: US 11,350,367 B1
(45) Date of Patent: May 31, 2022

(54) ADJUSTABLE LEAK GUARD FOR POWER SAVE DURING WIRELESS COMMUNICATIONS

(71) Applicant: QUALCOMM Incorporated, San Diego, CA (US)

(72) Inventors: Sandip Homchaudhuri, San Jose, CA (US); Steve Saed, San Jose, CA (US); Srikant Kuppa, Fremont, CA (US); Guido Robert Frederiks, Watsonville, CA (US); Lian Chen, San Jose, CA (US); Deepak Shahaji Nagawade, Fremont, CA (US); Vishwanath Tantry, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/407,029

(22) Filed: Aug. 19, 2021

Related U.S. Application Data

(60) Provisional application No. 63/128,972, filed on Dec. 22, 2020.

(51) Int. Cl.
*H04W 52/02* (2009.01)
(52) U.S. Cl.
CPC .............. *H04W 52/0229* (2013.01)
(58) Field of Classification Search
CPC ................................................. H04W 52/0229
See application file for complete search history.

(56) References Cited

U.S. PATENT DOCUMENTS

| 2013/0329614 | A1* | 12/2013 | Thakur | H04W 52/0216 370/311 |
| 2015/0173014 | A1* | 6/2015 | Lee | H04W 74/006 370/311 |
| 2018/0020410 | A1 | 1/2018 | Park | |
| 2021/0195524 | A1* | 6/2021 | Ahn | H04W 52/0229 |

FOREIGN PATENT DOCUMENTS

| EP | 2958367 A1 | 12/2015 |
| WO | 2013184694 A1 | 12/2013 |

OTHER PUBLICATIONS

International Search Report and Written Opinion—PCT/US2021/059344—ISA/EPO—dated Mar. 3, 2022.

* cited by examiner

*Primary Examiner* — Marcos L Torres
(74) *Attorney, Agent, or Firm* — Paradice and Li LLP /Qualcomm

(57) ABSTRACT

This disclosure provides systems, methods and apparatus, including computer programs encoded on computer storage media, for adjusting a time period to delay entering a power save mode (leak guard) for wireless communications. In one aspect, a wireless communication device may adjust a time period to delay entering a power save mode. The time period is associated with the wireless communication device remaining awake to prevent an access point from transmitting to the wireless communication device while the wireless communication device is in the power save mode. The wireless communication device also may provide, to the AP, an indication that the wireless communication device is entering a power save mode, and the wireless communication device may enter the power save mode. Entering the power save mode is at least the adjusted time period after providing the indication to the AP.

23 Claims, 15 Drawing Sheets

ADJUSTABLE LEAK GUARD FOR POWER SAVE DURING WIRELESS COMMUNICATIONS

CROSS-REFERENCE TO RELATED APPLICATIONS

This Patent application claims priority to U.S. Provisional Patent Application No. 63/128,972 entitled "ADJUSTABLE LEAK GUARD FOR POWER SAVE DURING WIRELESS COMMUNICATIONS" and filed on Dec. 22, 2020, which is assigned to the assignee hereof. The disclosures of all prior Applications are considered part of and are incorporated by reference in this Patent Application.

TECHNICAL FIELD

This disclosure relates generally to wireless communications, and more specifically to an adjustable leak guard for power save during wireless communications.

DESCRIPTION OF THE RELATED TECHNOLOGY

A wireless local area network (WLAN) may be formed by one or more access points (APs) that provide a shared wireless medium for use by a number of client devices or stations (STAs). Each AP, which may correspond to a Basic Service Set (BSS), periodically may broadcast beacon frames to enable any STAs within wireless range of the AP to establish and maintain a communication link with the WLAN. WLANs that operate in accordance with the IEEE 802.11 family of standards are commonly referred to as Wi-Fi networks. Since multiple devices share a wireless medium, a wireless communication device is not always the source or target of wireless communications on the wireless medium. In addition, the wireless medium may not be in use at some times.

When the wireless communication device is not listening to or transmitting over the wireless medium, one or more portions of the wireless communication device may enter a power save mode to conserve power. The wireless communication device may delay entering the power save mode to prevent the wireless communication device from being in the power save mode when the AP may attempt to transmit packets or frames to the wireless communication device. Increasing the amount of time that the wireless communication device is not in the power save mode increases power consumption of the wireless communication device.

SUMMARY

The systems, methods, and devices of this disclosure each have several innovative aspects, no single one of which is solely responsible for the desirable attributes disclosed herein.

One innovative aspect of the subject matter described in this disclosure can be implemented in a wireless communication device. An example wireless communication device includes a processing system and an interface. The processing system may be configured to adjust a time period associated with delaying entry into a power save mode, where the time period is associated with the wireless communication device remaining awake to prevent an access point (AP) from transmitting to the wireless communication device while the wireless communication device is in the power save mode. The interface may be configured to provide, to the AP, an indication that the wireless communication device is entering the power save mode. The processing system also may be configured to enter the wireless communication device into the power save mode upon expiration of at least the adjusted time period after providing the indication to the AP. In some implementations, entering the power save mode may be associated with receiving, from the AP, an acknowledgement of obtaining the indication. In some instances, the indication may include a Notification frame signaling an intention of the wireless communication device to enter the power save mode. In some other instances, the adjusted time period may be associated with a link quality between the wireless communication device and the AP.

In some implementations, the processing system may be configured to wake the wireless communication device from the power save mode. The interface may be configured to obtain one or more physical layer protocol data units (PPDUs) from the AP after waking from the power save mode. The one or more PPDUs may indicate whether the AP attempted to transmit to the wireless communication device while the wireless communication device was in the power save mode. In some instances, the interface also may be configured to provide a frame with a power management field set to 1 to the AP before entering the power save mode, and to provide a frame with the power management field set to 0 to the AP after waking from the power save mode. In some implementations, the indication of whether the AP attempted to transmit to the wireless communication device while the wireless communication device was in the power save mode may be included in a retry field in a header of at least one of the one or more PPDUs obtained from the AP, the retry field indicating that one or more media access control (MAC) protocol data units (MPDUs) are being resent by the AP.

In some implementations, the processing system also may be configured to obtain, from a reorder buffer of the wireless communication device, the largest sequence number of a MPDU carried in the last PPDU obtained from the AP before entering the power save mode. The processing system also may be configured to obtain, from a receive (Rx) protocol control unit (PCU) of the wireless communication device, a smallest sequence number of a MPDU carried in a first PPDU obtained from the AP after waking from the power save mode, where the adjusted time delay is associated with a difference between the smallest sequence number and the largest sequence number indicating that the MPDU carried in the last PPDU and the MPDU carried in the first PPDU are not consecutively obtained or received MPDUs. In some instances, the processing system also may be configured to obtain, from the Rx PCU, a first sequence number of a MPDU carried in a second PPDU obtained by the interface subsequent to obtaining the first PPDU, where the adjusted time delay is associated with the first sequence number being between the smallest sequence number and the largest sequence number.

In some other implementations, the interface also may be configured to obtain a third PPDU from the AP subsequent to obtaining the first PPDU. In some instances, the third PPDU is obtained after an end of a block acknowledgement (BA) window associated with the first PPDU, the second PPDU is obtained before the end of the BA window, and the adjusted time delay is not associated with sequence numbers of MPDUs in the third PPDU being between the smallest sequence number and the largest sequence number.

In some implementations, the processing system also may be configured to enter the wireless communication device into the power save mode and wake the wireless communication device from the power save mode multiple times. For each time the wireless communication device wakes from the power save mode, the processing system may be configured to obtain, from the reorder buffer, a largest sequence number of a MPDU carried in the last PPDU obtained by the interface before the wireless communication device enters the power save mode, and to obtain, from the Rx PCU, a smallest sequence number of a MPDU carried in a first PPDU obtained by the interface after the wireless communication device wakes from the power save mode. In some instances, for a threshold number of consecutive times the wireless communication device wakes from the power save mode, the adjusted time delay may be associated with a difference between the smallest sequence number and the largest sequence number indicating that the MPDU carried in the last PPDU and the MPDU carried in the first PPDU are not consecutively obtained or received MPDUs.

In some implementations, the processing system also may be configured to prevent the wireless communication device from entering the power save mode until a reorder buffer configured to obtain PPDUs from the AP is empty. The processing system also may be configured to periodically evaluate whether the AP attempts to transmit to the wireless communication device while the wireless communication device is in the power save mode. In some other implementations, the processing system also may be configured to obtain a header of a packet transmitted over a wireless communication medium, and to enter the wireless communication device into the power save mode after processing the header. In some instances, a recipient address in the header does not match an address of the wireless communication device, and a length of time of the power save mode may be associated with an amount of time the wireless communication medium is occupied during transmission of the packet. In some implementations, the processing system also may be configured to wake the wireless communication device from the power save mode after the length of time, where adjusting the time period includes disabling or enabling entering the power save mode by the wireless communication device.

Another innovative aspect of the subject matter described in this disclosure can be implemented as a method of wireless communication. The method may be performed by an apparatus of a wireless communication device, and may include adjusting a time period associated with delaying entry into a power save mode, where the time period is associated with the wireless communication device remaining awake to prevent an AP from transmitting to the wireless communication device while the wireless communication device is in the power save mode. The method also may include providing, to the AP, an indication that the wireless communication device is entering the power save mode. The method also may include entering the wireless communication device into the power save mode upon expiration of at least the adjusted time period after providing the indication to the AP. In some implementations, entering the power save mode may be associated with receiving, from the AP, an acknowledgement of obtaining the indication. In some instances, the indication may include a Notification frame signaling an intention of the wireless communication device to enter the power save mode. In some other instances, the adjusted time period may be associated with a link quality between the wireless communication device and the AP.

In some implementations, the method may include waking the wireless communication device from the power save mode. The method also may include obtaining one or more PPDUs from the AP after waking from the power save mode. The one or more PPDUs may indicate whether the AP attempted to transmit to the wireless communication device while the wireless communication device was in the power save mode. In some instances, the method also may include providing a frame with a power management field set to 1 to the AP before entering the power save mode, and providing a frame with the power management field set to 0 to the AP after waking from the power save mode. In some implementations, the indication of whether the AP attempted to transmit to the wireless communication device while the wireless communication device was in the power save mode may be included in a retry field in a header of at least one of the one or more PPDUs obtained from the AP, the retry field indicating that one or more MPDUs are being resent by the AP.

In some implementations, the method may include obtaining, from a reorder buffer of the wireless communication device, the largest sequence number of a MPDU carried in the last PPDU obtained from the AP before entering the power save mode. The method also may include obtaining, from an Rx PCU of the wireless communication device, the smallest sequence number of a MPDU carried in a first PPDU obtained from the AP after waking from the power save mode, where the adjusted time delay is associated with a difference between the smallest sequence number and the largest sequence number indicating that the MPDU carried in the last PPDU and the MPDU carried in the first PPDU are not consecutively obtained or received MPDUs. In some instances, the method also may include obtaining, from the Rx PCU, a first sequence number of a MPDU carried in a second PPDU obtained by the interface subsequent to obtaining the first PPDU, where the adjusted time delay is associated with the first sequence number being between the smallest sequence number and the largest sequence number.

In some other implementations, the method also may include obtaining a third PPDU from the AP subsequent to obtaining the first PPDU. In some instances, the third PPDU is obtained after an end of a block acknowledgement (BA) window associated with the first PPDU, the second PPDU is obtained before the end of the BA window, and the adjusted time delay is not associated with sequence numbers of MPDUs in the third PPDU being between the smallest sequence number and the largest sequence number.

In some implementations, the method also may include entering the wireless communication device into the power save mode and waking the wireless communication device from the power save mode multiple times. For each time the wireless communication device wakes from the power save mode, the wireless communication device may obtain, from the reorder buffer, a largest sequence number of a MPDU carried in the last PPDU obtained by the interface before the wireless communication device enters the power save mode, and may obtain, from the Rx PCU, a smallest sequence number of a MPDU carried in a first PPDU obtained by the interface after the wireless communication device wakes from the power save mode. In some instances, for a threshold number of consecutive times the wireless communication device wakes from the power save mode, the adjusted time delay may be associated with a difference between the smallest sequence number and the largest sequence number indicating that the MPDU carried in the last PPDU and the MPDU carried in the first PPDU are not consecutively obtained or received MPDUs.

In some implementations, the method also may include preventing the wireless communication device from entering the power save mode until a reorder buffer configured to obtain PPDUs from the AP is empty. The method also may include periodically evaluating whether the AP attempts to transmit to the wireless communication device while the wireless communication device is in the power save mode. In some other implementations, the method also may include obtaining a header of a packet transmitted over a wireless communication medium, and entering the wireless communication device into the power save mode after processing the header. In some instances, a recipient address in the header does not match an address of the wireless communication device, and a length of time of the power save mode may be associated with an amount of time the wireless communication medium is occupied during transmission of the packet. In some implementations, the method also may include waking the wireless communication device from the power save mode after the length of time, where adjusting the time period includes disabling or enabling entering the power save mode by the wireless communication device.

Another innovative aspect of the subject matter described in this disclosure can be implemented as a wireless communication device. In some implementations, the wireless communication device may include means for adjusting a time period associated with delaying entry into a power save mode, where the time period is associated with the wireless communication device remaining awake to prevent an AP from transmitting to the wireless communication device while the wireless communication device is in the power save mode. The wireless communication device may include means for providing, to the AP, an indication that the wireless communication device is entering the power save mode. The wireless communication device may include means for entering the wireless communication device into the power save mode upon expiration of at least the adjusted time period after providing the indication to the AP. In some implementations, entering the power save mode may be associated with receiving, from the AP, an acknowledgement of obtaining the indication. In some instances, the indication may include a Notification frame signaling an intention of the wireless communication device to enter the power save mode. In some other instances, the adjusted time period may be associated with a link quality between the wireless communication device and the AP.

In some implementations, the wireless communication device may include means for waking the wireless communication device from the power save mode. The wireless communication device also may include means for obtaining one or more PPDUs from the AP after waking from the power save mode. The one or more PPDUs may indicate whether the AP attempted to transmit to the wireless communication device while the wireless communication device was in the power save mode. In some instances, the wireless communication device may include means for providing a frame with a power management field set to 1 to the AP before entering the power save mode, and means for providing a frame with the power management field set to 0 to the AP after waking from the power save mode. In some implementations, the indication of whether the AP attempted to transmit to the wireless communication device while the wireless communication device was in the power save mode may be included in a retry field in a header of at least one of the one or more PPDUs obtained from the AP, the retry field indicating that one or more MPDUs are being resent by the AP.

In some implementations, the wireless communication device may include means for obtaining, from a reorder buffer of the wireless communication device, the largest sequence number of a MPDU carried in the last PPDU obtained from the AP before entering the power save mode. The wireless communication device also may include means for obtaining, from an Rx PCU of the wireless communication device, the smallest sequence number of a MPDU carried in a first PPDU obtained from the AP after waking from the power save mode, where the adjusted time delay is associated with a difference between the smallest sequence number and the largest sequence number indicating that the MPDU carried in the last PPDU and the MPDU carried in the first PPDU are not consecutively obtained or received MPDUs. In some instances, the wireless communication device also may include means for obtaining, from the Rx PCU, a first sequence number of a MPDU carried in a second PPDU obtained by the interface subsequent to obtaining the first PPDU, where the adjusted time delay is associated with the first sequence number being between the smallest sequence number and the largest sequence number.

In some other implementations, the wireless communication device also may include means for obtaining a third PPDU from the AP subsequent to obtaining the first PPDU. In some instances, the third PPDU is obtained after an end of a block acknowledgement (BA) window associated with the first PPDU, the second PPDU is obtained before the end of the BA window, and the adjusted time delay is not associated with sequence numbers of MPDUs in the third PPDU being between the smallest sequence number and the largest sequence number.

In some implementations, the wireless communication device also may include means for entering the wireless communication device into the power save mode and waking the wireless communication device from the power save mode multiple times. For each time the wireless communication device wakes from the power save mode, the wireless communication device may obtain, from the reorder buffer, a largest sequence number of a MPDU carried in the last PPDU obtained by the interface before the wireless communication device enters the power save mode, and may obtain, from the Rx PCU, a smallest sequence number of a MPDU carried in a first PPDU obtained by the interface after the wireless communication device wakes from the power save mode. In some instances, for a threshold number of consecutive times the wireless communication device wakes from the power save mode, the adjusted time delay may be associated with a difference between the smallest sequence number and the largest sequence number indicating that the MPDU carried in the last PPDU and the MPDU carried in the first PPDU are not consecutively obtained or received MPDUs.

In some implementations, the wireless communication device also may include means for preventing the wireless communication device from entering the power save mode until a reorder buffer configured to obtain PPDUs from the AP is empty. The wireless communication device may include means for periodically evaluating whether the AP attempts to transmit to the wireless communication device while the wireless communication device is in the power save mode. In some other implementations, the wireless communication device also may include means for obtaining a header of a packet transmitted over a wireless communication medium, and means for entering the wireless communication device into the power save mode after processing the header. In some instances, a recipient address in the header does not match an address of the wireless communication device, and a length of time of the power save mode may be associated with an amount of time the wireless communication medium is occupied during transmission of the packet. In some implementations, the wireless communication device also may include means for waking the wireless communication device from the power save mode after the length of time, where adjusting the time period includes disabling or enabling entering the power save mode by the wireless communication device.

Another innovative aspect of the subject matter described in this disclosure can be implemented as a non-transitory, computer readable medium storing instructions that, when executed by a processing system of a wireless communication device, cause the wireless communication device to perform one or more operations. In some implementations, the operations may include adjusting a time period associated with delaying entry into a power save mode, where the time period is associated with the wireless communication device remaining awake to prevent an AP from transmitting to the wireless communication device while the wireless communication device is in the power save mode. The operations may include providing, to the AP, an indication that the wireless communication device is entering the power save mode. The operations may include entering the wireless communication device into the power save mode upon expiration of at least the adjusted time period after providing the indication to the AP. In some implementations, entering the power save mode may be associated with receiving, from the AP, an acknowledgement of obtaining the indication. In some instances, the indication may include a Notification frame signaling an intention of the wireless communication device to enter the power save mode. In some other instances, the adjusted time period may be associated with a link quality between the wireless communication device and the AP.

In some implementations, the operations also may include waking the wireless communication device from the power save mode. The operations may include obtaining one or more PPDUs from the AP after waking from the power save mode. The one or more PPDUs may indicate whether the AP attempted to transmit to the wireless communication device while the wireless communication device was in the power save mode. In some instances, the operations may include providing a frame with a power management field set to 1 to the AP before entering the power save mode, and providing a frame with the power management field set to 0 to the AP after waking from the power save mode. In some implementations, the indication of whether the AP attempted to transmit to the wireless communication device while the wireless communication device was in the power save mode may be included in a retry field in a header of at least one of the one or more PPDUs obtained from the AP, the retry field indicating that one or more MPDUs are being resent by the AP.

In some implementations, the operations also may include obtaining, from a reorder buffer of the wireless communication device, the largest sequence number of a MPDU carried in the last PPDU obtained from the AP before entering the power save mode. The operations may include obtaining, from an Rx PCU of the wireless communication device, the smallest sequence number of a MPDU carried in a first PPDU obtained from the AP after waking from the power save mode, where the adjusted time delay is associated with a difference between the smallest sequence number and the largest sequence number indicating that the MPDU carried in the last PPDU and the MPDU carried in the first PPDU are not consecutively obtained or received MPDUs. In some instances, the operations may include obtaining, from the Rx PCU, a first sequence number of a MPDU carried in a second PPDU obtained by the interface subsequent to obtaining the first PPDU, where the adjusted time delay is associated with the first sequence number being between the smallest sequence number and the largest sequence number.

In some other implementations, the operations also may include obtaining a third PPDU from the AP subsequent to obtaining the first PPDU. In some instances, the third PPDU is obtained after an end of a BA window associated with the first PPDU, the second PPDU is obtained before the end of the BA window, and the adjusted time delay is not associated with sequence numbers of MPDUs in the third PPDU being between the smallest sequence number and the largest sequence number.

In some implementations, the operations also may include entering the wireless communication device into the power save mode and waking the wireless communication device from the power save mode multiple times. For each time the wireless communication device wakes from the power save mode, the wireless communication device may obtain, from the reorder buffer, a largest sequence number of a MPDU carried in the last PPDU obtained by the interface before the wireless communication device enters the power save mode, and may obtain, from the Rx PCU, a smallest sequence number of a MPDU carried in a first PPDU obtained by the interface after the wireless communication device wakes from the power save mode. In some instances, for a threshold number of consecutive times the wireless communication device wakes from the power save mode, the adjusted time delay may be associated with a difference between the smallest sequence number and the largest sequence number indicating that the MPDU carried in the last PPDU and the MPDU carried in the first PPDU are not consecutively obtained or received MPDUs.

In some implementations, the operations may include preventing the wireless communication device from entering the power save mode until a reorder buffer configured to obtain PPDUs from the AP is empty. The operations may include periodically evaluating whether the AP attempts to transmit to the wireless communication device while the wireless communication device is in the power save mode. In some other implementations, the operations may include obtaining a header of a packet transmitted over a wireless communication medium, and entering the wireless communication device into the power save mode after processing the header. In some instances, a recipient address in the header does not match an address of the wireless communication device, and a length of time of the power save mode may be associated with an amount of time the wireless communication medium is occupied during transmission of the packet. In some implementations, the operations may include waking the wireless communication device from the power save mode after the length of time, where adjusting the time period includes disabling or enabling entering the power save mode by the wireless communication device.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
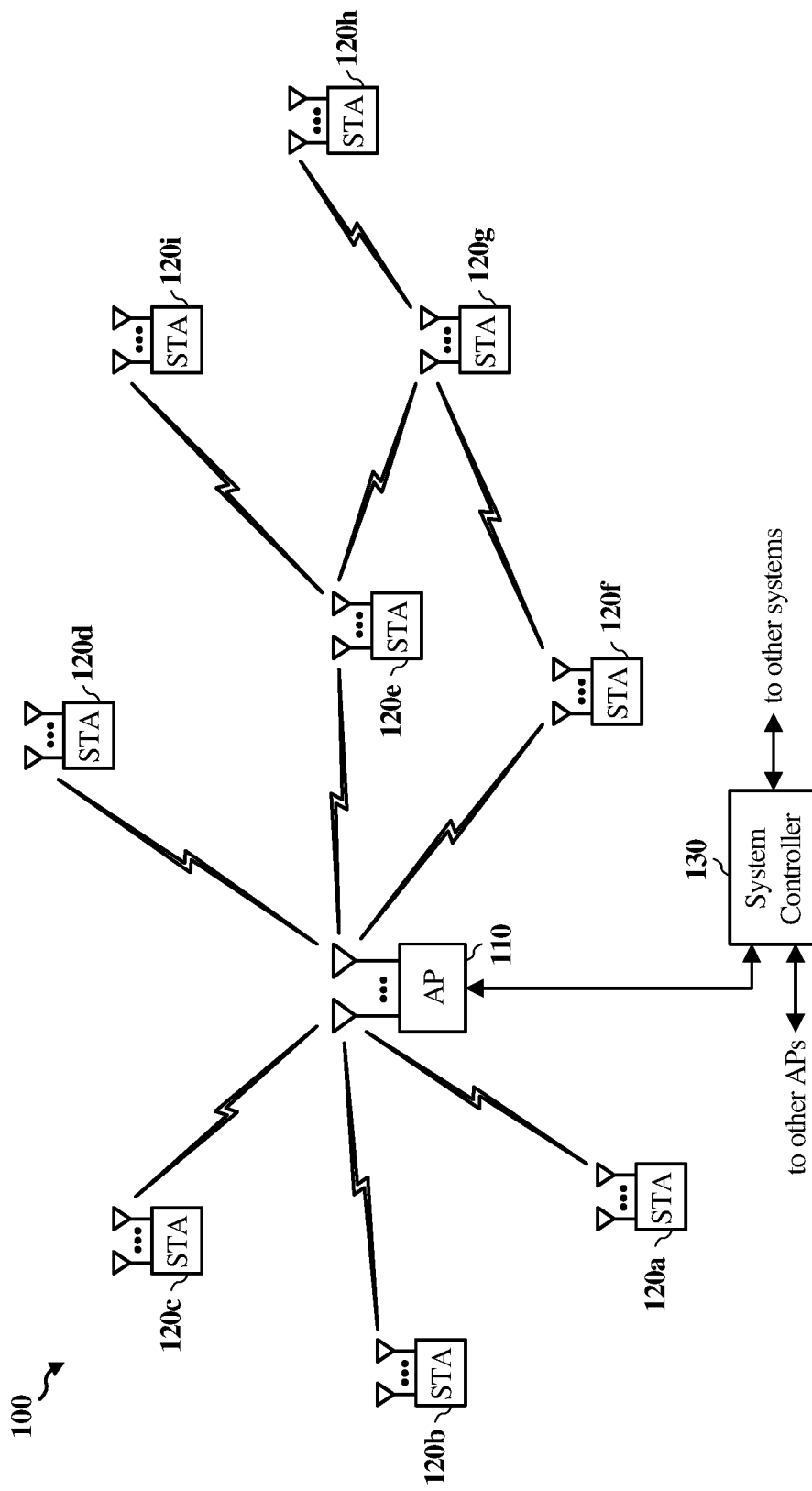
FIG. 1 shows a block diagram of an example wireless system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Implementations of the subject matter described in this disclosure may be used for adjusting a time period used to delay a STA from entering a power save mode. When a STA is not transmitting or receiving wireless communications, the STA may enter a power save mode to conserve power consumption. The STA may indicate to one or more APs within range of the STA that the STA is to enter the power save mode. In some implementations, the STA may transmit, to the AP over a wireless channel, a frame indicating an intention of the STA to enter the power save mode. In some instances, the frame may be any management frame or action frame including one or more elements, subelements, fields, or subfields suitable for carrying an indication of the STA's intention to enter the power save mode. In some other instances, the frame may be a specific type of frame such as (but not limited to) a Notification frame that carries the indication of the STA's intention to enter the power save mode. The STA enters the power save mode by placing one or more device components (such as front end components of the wireless interface) into a low power state. While in the power save mode, the STA may not be able to receive or successfully decode downlink (DL) data transmitted on the wireless channel. In some instances, the AP may be configured to terminate or suspend downlink transmissions based on receiving or obtaining the STA's intention of the STA to enter the power save mode, for example, to reduce packet loss or to avoid re-transmissions of data frames that were not received or successfully decoded by the STA. In some other instances, the STA may expect the AP to terminate or suspend downlink transmissions based on receiving or obtaining the intention to enter the power save mode. In some implementations, the STA may be configured to enter the power save mode in response to receiving, from the AP, an acknowledgement of the STA's intention to enter the power save mode. In some instances, the acknowledgement may be an ACK frame. In some other instances, the acknowledgement may be a Notification frame.

In some instances, the AP may attempt to send one or more packets to the STA after sending an acknowledgement of the STA's intention to enter the power save mode. Such packets sent by the AP and not received by the STA while the STA is in the power save mode may be referred to herein as "leaked" packets, and the AP sending such packets may be referred to herein as a "leaky" AP. The time period by which the STA delays entering the power save mode after sending the intention to enter the power save mode to the AP may be referred to herein as a "leak guard."

In some instances, leaked packets may be transmitted to the STA at or near the beginning of the STA's power save mode. For example, the AP may spend a certain duration of time to configure itself to not send packets to the STA after receiving the indication. As a result, one or more packets may be sent by the AP to the STA before such configuration is completed. Delaying the STA from entering the power save mode by a period of time associated with the leak guard may allow the STA to remain awake and receive or obtain the one or more packets transmitted by the AP after receiving the indication.

In some implementations, power savings may be achieved by adjusting the leak guard based on previous communications with the AP. For example, a STA may determine whether one or more leaked packets exist during a power save mode, and may adjust the leak guard in response to determining whether or not one or more leaked packets existed. If no leaked packets are identified, the STA may turn off or reduce the leak guard (such as from 5 milliseconds (ms) to less than 5 ms or 0 ms). If the existence or the possibility of one or more leaked packets is identified, the STA may set the leak guard to a predefined value (such as 5 ms) to prevent leaked packets during the wireless communication device's next entry into the power save mode.

Particular implementations of the subject matter described in this disclosure can be implemented to realize one or more of the following potential advantages. When the period of time associated with the leak guard is reduced (or eliminated), power consumption of the STA may be reduced (such as by allowing the STA to spend more time in the power save mode). For example, if the period of time associated with the leak guard is reduced from 10 ms to 5 ms (or 0 ms), the STA may conserve power by entering the power save mode 5 or 10 ms earlier than when using a leak guard of 5 or 10 ms, respectively. In this manner, the STA may not consume power listening to the wireless medium, which requires device components to remain in an active state, and may instead enter the power save mode. If the STA is battery powered, conserving power may extend the operating time of the STA between battery charges. Selective use or adjustment of the leak guard may increase throughput of the wireless medium by preventing (or at least reducing the occurrence of) leaked packets. For example, if an AP attempts to transmit packets to a STA in a power save mode, the AP may wait for an acknowledgement (ACK) from the STA indicating that the packets were received before transmitting additional packets to the STA. Failure to receive the ACK from the STA can drive the rate adaptation algorithm in the AP to lower the MCS (Modulation & Coding Scheme) of the subsequent packets and therefore impact the overall throughput of the link.

When the STA is in the power save mode, the STA does not receive the transmitted packets, and thus does not send an ACK to the AP. In some instances, the AP may use the absence of ACK frames received from the STA as an indication to perform rate control (such as lowering the MCS or otherwise slowing the rate at which packets are sent to the STA) and attempt to resend the packets to the STA. If the STA remains in the power save mode during transmission of the resent packets, the AP may not receive any ACKs for the resent packets. The AP may further reduce the rate at which packets are sent to the STA, and resend the packets to the STA. In this manner, the AP may slow or stall communications on the wireless medium by continuously occupying the wireless medium in an attempt to deliver the packets to the STA (without receiving ACKs). When the STA delays entry into the power save mode by the period of time associated with the leak guard (such as in response to the transmission of leaked packets by the AP), the STA may be awake to receive or obtain the resent packets. The STA may send one or more ACKs to the AP confirming reception of the resent packets, thereby obviating (or at least relaxing) the need for the AP to slow communications on the wireless medium. In this way, implementations of the subject matter disclosed herein may increase throughput on the wireless medium.

FIG. 1 shows a block diagram of an example wireless system 100. The wireless system 100 is shown to include a wireless access point (AP) 110 and a number of wireless stations (STAs) 120a-120i. For simplicity, one AP 110 is shown in FIG. 1. The AP 110 may form a wireless local area network (WLAN) that allows the AP 110, the STAs 120a-120i, and other wireless devices (not shown for simplicity) to communicate with each other over a wireless medium. The wireless medium, which may be divided into a number of channels or into a number of resource units (RUs), may facilitate wireless communications between the AP 110, the STAs 120a-120i, and other wireless devices connected to the WLAN. In some implementations, the STAs 120a-120i can communicate with each other using peer-to-peer communications (such as without the presence or involvement of the AP 110). The AP 110 may be assigned a unique medium access control (MAC) address that is programmed therein by, for example, the manufacturer of the AP. Similarly, each of the STAs 120a-120i also may be assigned a unique MAC address.

In some implementations, the wireless system 100 may correspond to a multiple-input multiple-output (MIMO) wireless network and may support single-user MIMO (SU-MIMO) and multi-user (MU-MIMO) communications. In some implementations, the wireless system 100 may support orthogonal frequency-division multiple access (OFDMA) communications. Further, although the WLAN is depicted in FIG. 1 as an infrastructure Basic Service Set (BSS), in some other implementations, the WLAN may be an Independent Basic Service Set (IBSS), an Extended Service Set (ESS), an ad-hoc network, or a peer-to-peer (P2P) network (such as operating according to one or more Wi-Fi Direct protocols).

The STAs 120a-120i may be any suitable Wi-Fi enabled wireless devices including, for example, cell phones, personal digital assistants (PDAs), tablet devices, laptop computers, or the like. The STAs 120a-120i also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The AP 110 may be any suitable device that allows one or more wireless devices (such as the STAs 120a-120i) to connect to another network (such as a local area network (LAN), wide area network (WAN), metropolitan area network (MAN), or the Internet). In some implementations, a system controller 130 may facilitate communications between the AP 110 and other networks or systems. In some implementations, the system controller 130 may facilitate communications between the AP 110 and one or more other APs (not shown for simplicity) that may be associated with other wireless networks. In addition, or in the alternative, the AP 110 may exchange signals and information with one or more other APs using wireless communications.

The AP 110 periodically may broadcast beacon frames to enable the STAs 120a-120i and other wireless devices within wireless range of the AP 110 to establish and maintain a communication link with the AP 110. The beacon frames, which may indicate downlink (DL) data transmissions to the STAs 120a-120i and solicit or schedule uplink (UL) data transmissions from the STAs 120a-120i, are typically broadcast according to a target beacon transmission time (TBTT) schedule. The broadcasted beacon frames may include a timing synchronization function (TSF) value of the AP 110. The STAs 120a-120i may synchronize their own local TSF values with the broadcasted TSF value, for example, so that all of the STAs 120a-120i are synchronized with each other and with the AP 110.

In some implementations, each of the STAs 120a-120i and the AP 110 may include an interface (such as one or more transceivers), a processing system (such as one or more processing resources (such as processors or Application-Specific Integrated Circuits (ASICs)) and one or more memory resources), and a power source (such as a battery). The one or more transceivers may include Wi-Fi transceivers, Bluetooth transceivers, cellular transceivers, or other suitable radio frequency (RF) transceivers (not shown for simplicity) to transmit and receive wireless communication signals. In some implementations, each transceiver may communicate with other wireless devices in distinct frequency bands or using distinct communication protocols. The memory resources may include a non-transitory computer-readable medium (such as one or more nonvolatile memory elements, such as EPROM, EEPROM, Flash memory, a hard drive, etc.) that stores instructions for performing one or more operations described with respect to FIGS. 9-11.

Figure 2:
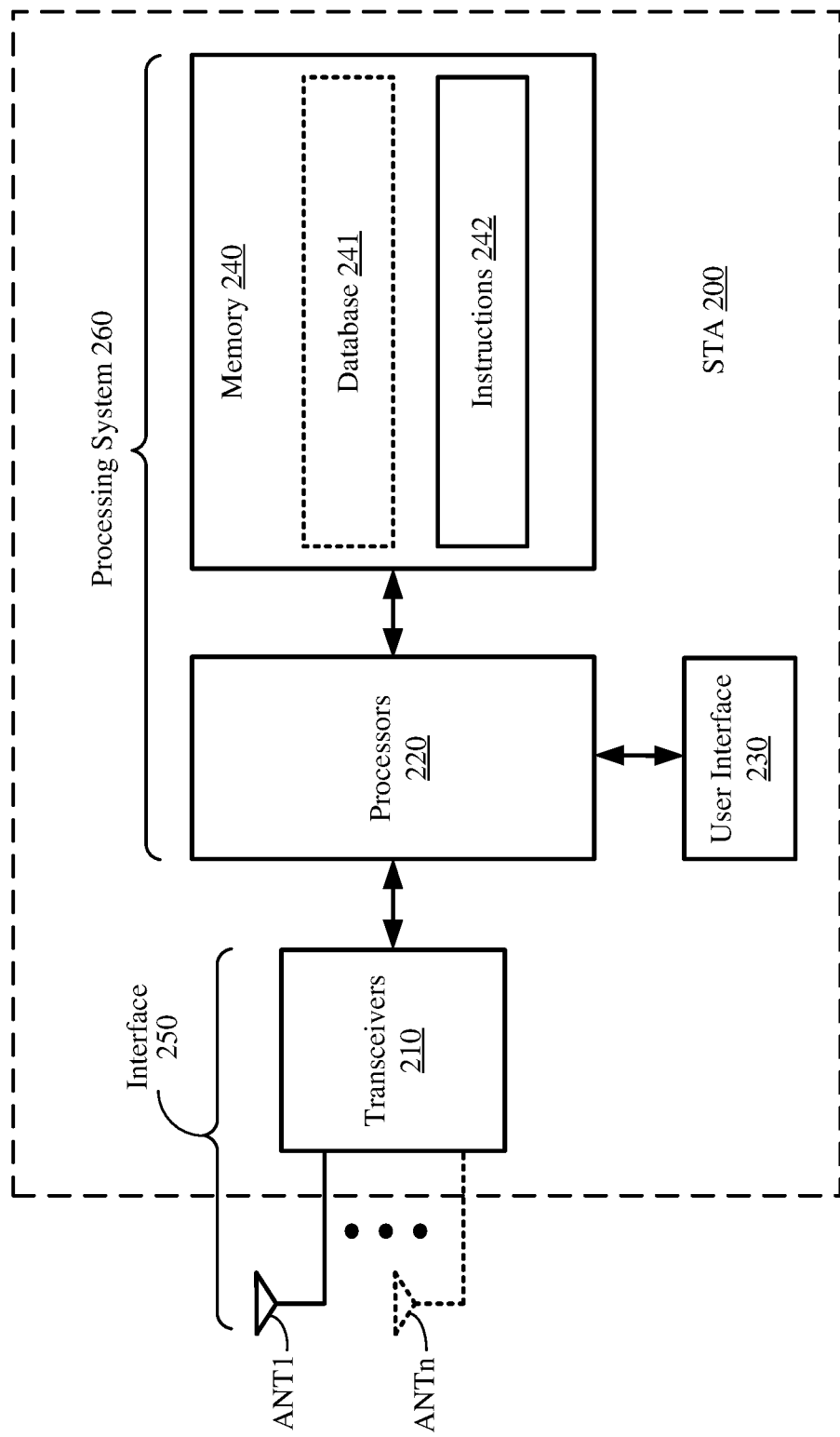
FIG. 2 shows a block diagram of an example wireless station (STA).

FIG. 2 shows an example wireless station (STA) 200. The STA 200 may be one implementation of at least one of the STAs 120a-120i of FIG. 1. The STA 200 may include one or more transceivers 210, one or more processors 220, a memory 240, and one or more antennas ANT1-ANTn. In some implementations, the STA 200 also may include a user interface 230. The transceiver 210 may include one or more transceivers coupled to the one or more antennas ANT1-ANTn, either directly or through an antenna selection circuit (not shown for simplicity). A transceiver 210 may be used to transmit signals to and receive signals from other wireless devices including, for example, a number of APs and a number of other STAs. Although not shown in FIG. 2 for simplicity, each of the one or more transceivers 210 may include any number of transmit chains to process and transmit signals to other wireless devices via antennas ANT1-ANTn and may include any number of receive chains to process signals received from antennas ANT1-ANTn. Thus, the STA 200 may be configured for MIMO communications and OFDMA communications in some implementations. The MIMO communications may include SU-MIMO communications and MU-MIMO communications. In some implementations, the STA 200 may use multiple antennas ANT1-ANTn to provide antenna diversity. Antenna diversity may include polarization diversity, pattern diversity, and spatial diversity. An example transceiver is described below with reference to FIG. 3.

The one or more processors 220 may be any suitable one or more processors capable of executing scripts or instructions of one or more software programs stored in the STA 200 (such as within the memory 240). In some implementations, the one or more processors 220 may be or include one or more microprocessors providing the processor functionality and external memory providing at least a portion of machine-readable media. In other implementations, the one or more processors 220 may be or include an Application Specific Integrated Circuit (ASIC) with the processor, the bus interface, the user interface, and at least a portion of the machine-readable media integrated into a single chip. In some other implementations, the one or more processors 220 may be or include one or more Field Programmable Gate Arrays (FPGAs) or Programmable Logic Devices (PLDs).

The user interface 230, which may be coupled to the one or more processors 220, may be or represent a number of suitable user input devices such as, for example, a speaker, a microphone, a display device, a keyboard, a touch screen, and so on. In some implementations, the user interface 230 may allow a user to control a number of operations of the STA 200, to interact with one or more applications executable by the STA 200, and other suitable functions.

In some implementations, the memory 240 may include a database 241 that may store one or more identifiers of leaky APs. For example, the database 241 may store a BSS identifier (BSSID) associated with a leaky AP. In another example, the database 241 may store a MAC address of the leaky AP or another suitable identifier.

The memory 240 also may be or include a non-transitory computer-readable storage medium (such as one or more nonvolatile memory elements, such as EPROM, EEPROM, Flash memory, a hard drive, and so on) that may store computer-executable instructions 242 to perform all or a portion of one or more operations described in this disclosure.

An interface 250 of the STA 200 may refer to the one or more transceivers 210 coupled to the one or more antennas ANT1-ANTn. In some implementations, the interface 250 of the STA 200 also may refer to the one or more antennas ANT1-ANTn coupled to the one or more transceivers 210. The interface 250 is configured to obtain packets from an AP and provide packets to the AP while the STA 200 communicates with the AP. A processing system 260 of the STA 200 may refer to the one or more processors 220. In some implementations, the processing system 260 also may refer to the memory 240 (such as the media storing instructions 242).

While the one or more transceivers 210, the memory 240, and the optional user interface 230 are depicted as being coupled via the one or more processors 220 in FIG. 2, the components of the STA 200 may be coupled in any suitable manner. For example, the one or more transceivers 210, the one or more processors 220, and the memory 240 may be coupled directly to one another via one or more buses.

Figure 3:
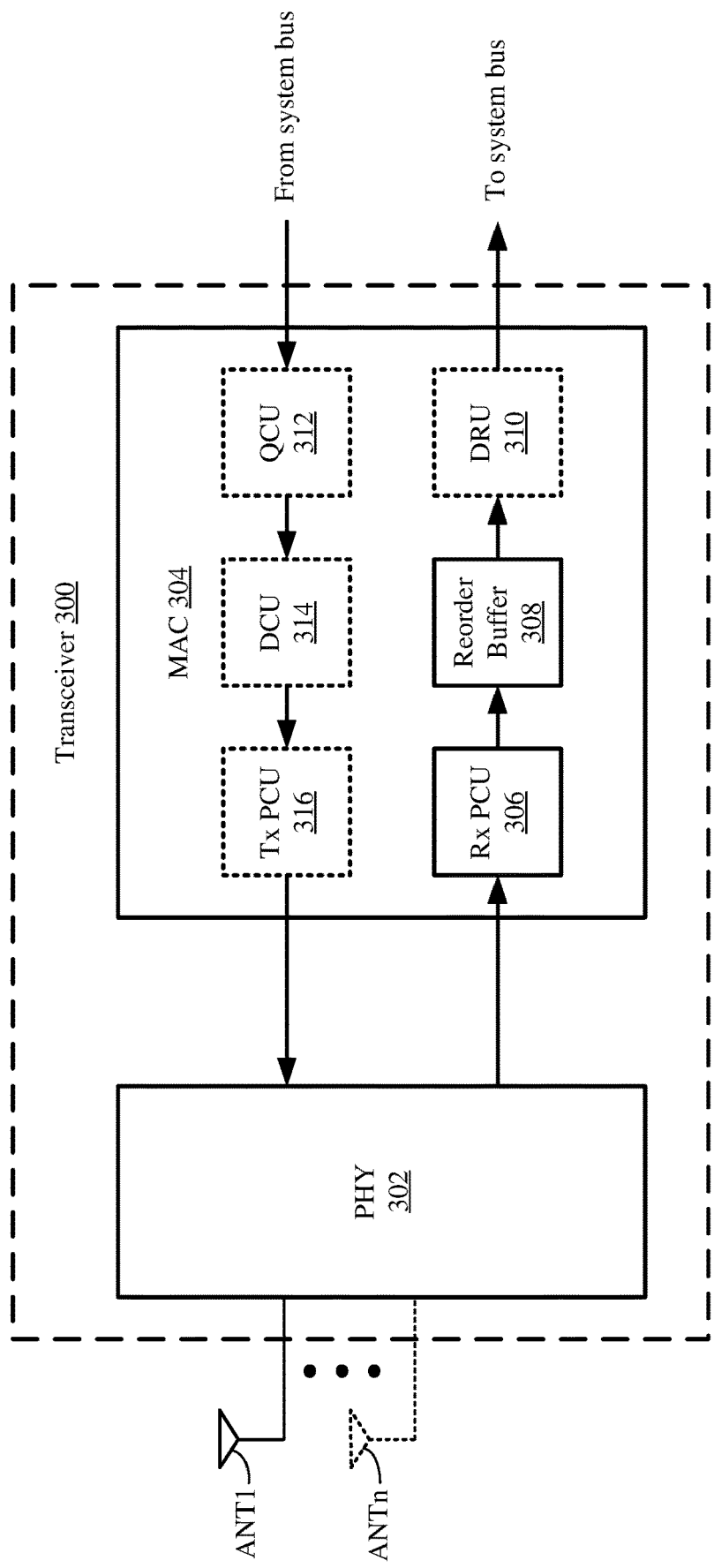
FIG. 3 shows a block diagram of an example transceiver of a STA.

FIG. 3 shows a block diagram of an example transceiver 300 of a STA. In some implementations, the transceiver 300 may be one example of the one or more transceivers 210 of FIG. 2. The transceiver 300 may include a physical layer (PHY) 302 and a MAC layer 304. The PHY 302 may be coupled to the one or more antennas ANT1-ANTn to transmit and receive packets to and from another wireless device. The PHY 302 also may be configured to process packets at the physical layer. For example, the PHY 302 may perform scrambling, encoding, puncturing, padding, parsing, interleaving, modulating, or digital to analog conversion (DAC) for packets to be transmitted. In another example, the PHY 302 may perform analog to digital conversion (ADC), MIMO equalization, de-interleaving, spatial combination, decoding, or descrambling for packets received from another wireless device. While not shown in FIG. 3, the PHY 302 may include or be coupled to one or more radios used to transmit and receive signals via the one or more antennas ANT1-ANTn. For example, the PHY 302 may be configured to perform baseband digital processing operations, and the one or more radios may be configured to perform baseband analog processing operations for received packets or packets to be transmitted via the one or more antennas ANT1-ANTn.

The MAC 304 is configured to process packets to be provided to the PHY 302 for transmission and process packets obtained from the PHY 302. For example, the MAC 304 may be configured to packetize information of the wireless communication device (such as the STA 200 in FIG. 2) to provide to the PHY 302 for transmission to another wireless device (such as an AP). The MAC 304 also may be configured to order and format packets for transmission (such as by including MAC headers including MAC sequence numbers to the packet payloads). In another example, the MAC 304 may be configured to obtain information for the wireless communication device from packets obtained from the PHY 302. For example, the MAC 304 may process the MAC headers included in the decoded packets obtained from the PHY 302.

The MAC 304 includes a receive (Rx) protocol control unit (PCU) 306 and a reorder buffer 308. In some implementations, the MAC 304 also may include a direct memory access (DMA) Rx unit (DRU) 310 to provide information from the obtained packets to a system bus (such as to provide the information to a device memory). In some implementations, the transmit portion of the MAC 304 may include a queue control unit (QCU) 312, a distributed coordination function (DCF) control unit (DCU) 314, and a transmit (Tx) PCU 316. While the Rx PCU 306 and the Tx PCU 316 are shown as separate components, the MAC 304 may include a PCU including both the Rx PCU 306 and the Tx PCU 316.

The Rx PCU 306 may obtain frames from the PHY 302. In some implementations, the Rx PCU may obtain a physical bitstream from the PHY 302, decrypt each frame from the obtained bitstream, and provide at least portions of the decrypted frames to the DRU 310. For example, the bitstream may include one or more PHY protocol data units (PPDUs), and the Rx PCU may process each PPDU to obtain one or more MAC sequence numbers of the MAC protocol data units (MPDUs) in the PPDU. The device may use the obtained MAC sequence numbers to determine whether an AP attempted to transmit packets to the device when the device is in a power save mode. As used herein, a packet may refer to a MPDU or any other suitable data unit. For example, a leaked packet may refer to a MPDU attempted to be transmitted to the wireless communication device when the wireless communication device is in a power save mode.

The reorder buffer 308 may be configured to obtain decoded packets from the Rx PCU 306 and reorder the decoded packets from the order they were obtained. In some implementations, packets may be received out of order. For example, a PPDU may skip one or more MPDUs, and the skipped MPDUs may be included in a subsequent PPDU. In this manner, the reorder buffer 308 may be configured to reorder the packets based on the MAC sequence numbers. The reorder buffer 308 also may be configured to provide the reordered packets to a DRU 310 or directly to memory (such as a memory 240 or other suitable memory via a system bus). If a packet is missing in the reorder buffer 308, subsequent packets may be kept in the reorder buffer 308 (and not provided to the DRU 310 or a memory) until the reorder buffer 308 obtains the missing packet. In this manner, the reorder buffer 308 is not empty if all packets with smaller sequence numbers than a received packet with the largest sequence number are not yet obtained.

The Rx PCU 306 may be configured so that one or more sequence numbers of packets in a PPDU may be obtained from the Rx PCU 306. In some implementations, the reorder buffer 308 includes a plurality of registers used to obtain a sequence number from the Rx PCU 306. For example, nine registers of the reorder buffer may be used to obtain the largest sequence number of a last received PPDU before the wireless communication device indicates that it is to enter a power save mode to the AP. In this manner, when the reorder buffer 308 obtains packets after the wireless communication device wakes from the power save mode, the stored largest sequence number may be used by the reorder buffer 308 as a reference to determine if any sequence numbers have been skipped (such as if the difference between the largest sequence number stored in the registers and the smallest sequence number obtained after the device wakes from the power save mode is greater than one). One or more skipped sequence numbers may indicate one or more missing packets that may have been leaked. In some implementations, the Rx PCU 306 may provide a smallest sequence number of a first PPDU received after waking from the power save mode (or other sequence numbers from the first PPDU or subsequent PPDUs during a BA window). One or more obtained sequence numbers from the Rx PCU 306 may be included in a type-length-value (TLV) encoded message, which may be provided to a processing system of the wireless communication device.

In some implementations, the decoded packets (which may be reordered) may be received from the reorder buffer 308 to the DRU 310 and provided to a processing system (such as the processor 220 or the memory 240 in FIG. 2). The DRU 310 may be configured to provide the packet information to a memory via a system bus, and the information may be accessed from the memory by one or more processors. In some other implementations, the reorder buffer 308 may provide packet information directly to a memory via a system bus. In this manner, the packet information may not flow from the reorder buffer 308 to the DRU 310, but rather from the reorder buffer 308 to memory or other portions of the wireless communication device.

For the transmit side of the MAC 304, the QCU 312 may include one or more QCUs configured to manage the DMA of frame data from the system bus, to obtain the frame data from the device (such as from a system bus), to determine when a frame is available for transmission, and to provide data frames to the DCU 314 for transmission to another wireless device. The DCU 314 may include one or more DCUs configured to obtain the data frames from the QCU 312, to manage DCF channel access procedures for the data frames on behalf of the QCU 312, and to provide the data frames to the Tx PCU 316 using the DCF channel access procedures. In some implementations, the MAC 304 includes a DCU that corresponds to each QCU. For example, if the MAC 304 includes 10 QCUs, the MAC 304 may include 10 DCUs. If the MAC 304 includes multiple DCUs, the MAC 304 may include arbitration logic (not shown) to combine the outputs from the multiple DCUs into an input to the Tx PCU 316. The Tx PCU 316 may be configured to encrypt each frame and provide the encrypted frames to the PHY 302 for transmission to another wireless device. A combined PCU (including the Rx PCU 306 and the Tx PCU 316) also may be configured to process obtained responses to a transmitted frame (such as an acknowledgement (ACK), including a block ACK (BA), an error indication, or other suitable information elements) and reporting transmission attempt results to the DCU 314 configured to determine access to the wireless medium.

As discussed, MAC sequence numbers may be used to determine whether one or more packets were leaked when the wireless communication device was in the power save mode. In some implementations, a retry indication also may be used to determine whether one or more packets were leaked when the wireless communication device was in the power save mode. The MAC sequence numbers and the retry indication may be included in a PPDU obtained from an AP (or another suitable wireless device). In some implementations, the transceiver 300 is configured to obtain one or more of a largest MAC sequence number or a smallest MAC sequence number from a PPDU. For example, the one or more sequence numbers may be obtained from the Rx PCU 306 after being decoded by the Rx PCU 306. The transceiver 300 also may be configured to generate a message including the smallest sequence number and the largest sequence number. In one example, the message may be a TLV encoded message including the sequence numbers. The TLV encoded message also may include retry field information obtained from a PPDU (such as from a MAC header of the PPDU).

Figure 4:
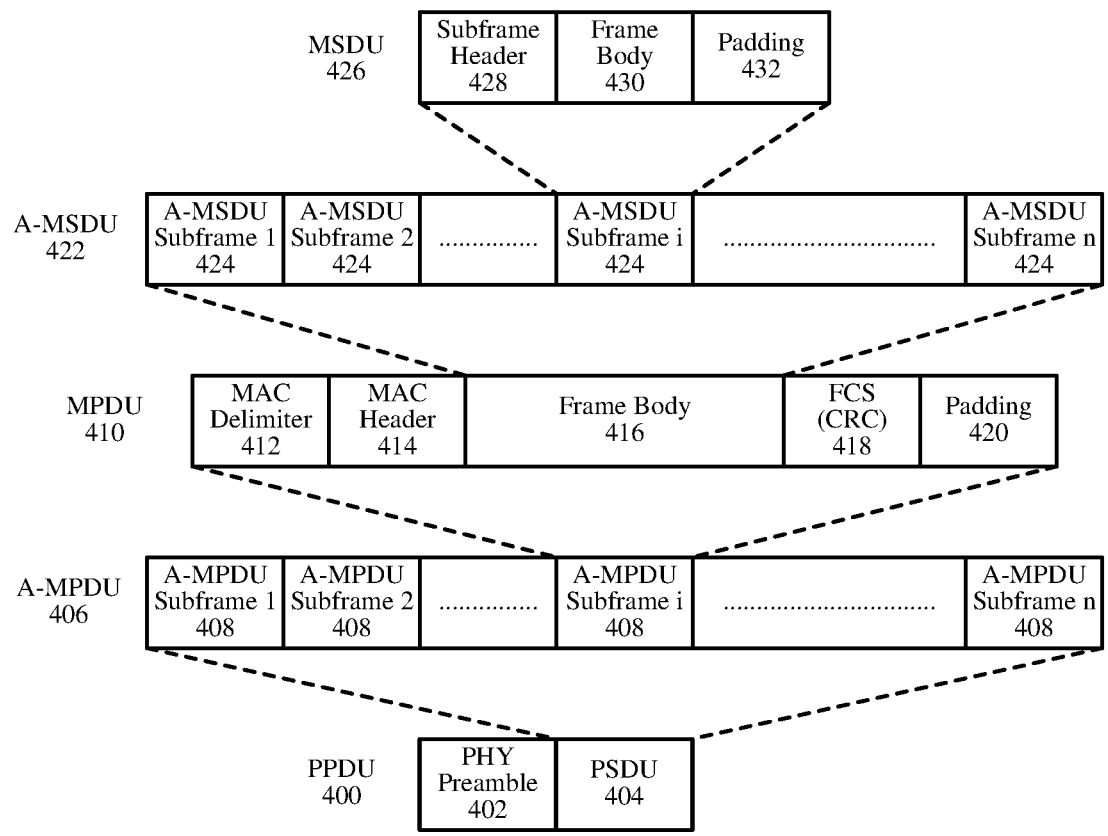
FIG. 4 shows an example physical layer (PHY) protocol data unit (PPDU) usable for communication between an access point (AP) and one or more STAs.

FIG. 4 shows an example PPDU 400 usable for communication between an AP and one or more STAs. For example, the example PPDU 400 may be used for communication between an AP 110 and one or more STAs 120a-120i in FIG. 1. Each PPDU 400 includes a PHY preamble 402 and a PHY service data unit (PSDU) 404. Each PSDU 404 may represent (or "carry") one or more MPDUs 410. For example, each PSDU 404 may carry an aggregated MPDU (A-MPDU) 406 that includes an aggregation of multiple A-MPDU subframes 408. Each A-MPDU subframe 408 may include a MPDU 410 that includes a MAC delimiter 412 and a MAC header 414 prior to the accompanying frame body 416, which includes the data portion ("payload" or "frame body") of the MPDU 410. Each MPDU 410 also may include a frame check sequence (FCS) field 418 for error detection. In some instances, the FCS field 418 may include cyclic redundancy check (CRC)) and padding 420. The frame body 416 may carry one or more MAC service data units (MSDUs). For example, the frame body 416 may carry an aggregated MSDU (A-MSDU) 422 including multiple A-MSDU subframes 424. Each A-MSDU subframe 424 may include a MSDU 426 that includes a subframe header 428, followed by a frame body 430, followed by padding 432.

The MAC delimiter 412 may serve as a marker of the start of the associated MPDU 410, and may indicate the length of the associated MPDU 410. The MAC header 414 may include multiple fields containing information that defines or indicates characteristics or attributes of data encapsulated within the frame body 416. The MAC header 414 includes a duration field indicating a duration extending from the end of the PPDU until at least the end of an ACK or BA of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

In some implementations, the MAC header 414 includes a MAC sequence number associated with the MPDU 410. For example, a MAC sequence control field of the MAC header 414 may include an octet of values for indicating a MAC sequence number for the associated MPDU 410. The AP may assign MAC sequence numbers in sequence to the MPDUs 410. In this manner, if the STA obtains a first MAC sequence number and a second MAC sequence number that is not in sequence (such as a MAC sequence number missing between the first and second sequence numbers), the STA may determine that one or more MPDUs are missing from the AP.

In addition, the MAC header 414 may include an indication as to whether the AP is to retry sending packets to a STA. For example, a frame control field of the MAC header 414 may include a retry field. The retry field may be one bit in length. The retry field may be set to 1 to indicate that the AP is to retry sending packets previously sent by the AP (such as leaked packets not obtained by the STA in a power save mode or other packets for which the AP did not receive an ACK). The retry field may be set to 0 to indicate that the AP does not have any packets to retry sending. In this manner, if the STA obtains a PPDU that includes a retry field set to 1 after waking from power save mode, the STA may determine that one or more MPDUs were leaked by the AP when the STA was in the power save mode.

A leaky AP may perform various operations when the STA wakes from power save mode. In some implementations, the STA may use one or more of the various operations to determine whether the AP leaked packets while the STA was in the power save mode. In some instances, the STA may use MAC sequence numbers provided in PPDUs received by the STA to determine whether the AP is leaky. In some other instances, the STA may use the retry field included PPDUs received by the STA to determine whether the AP is leaky.

Figure 5:
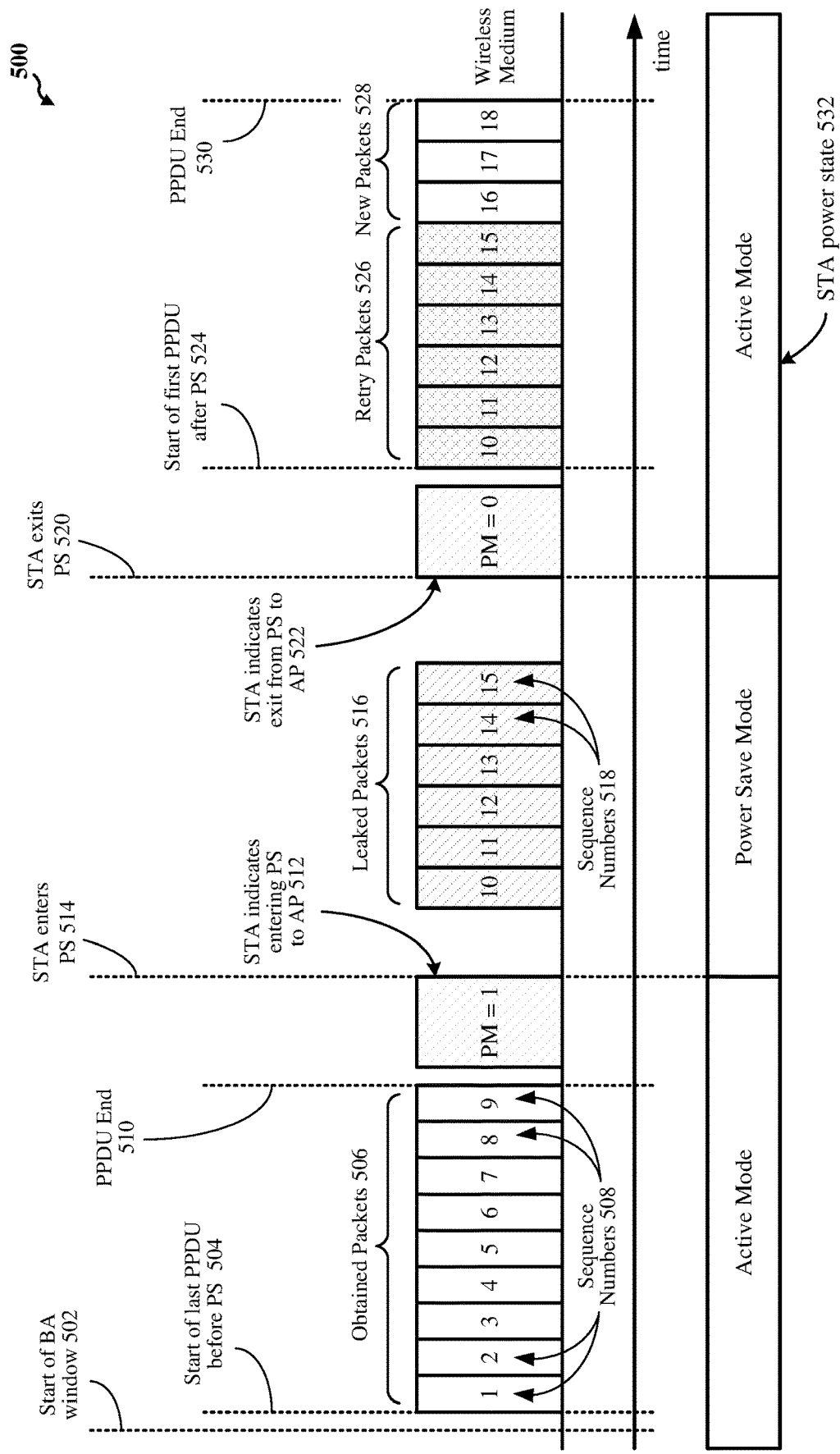
FIG. 5 shows an example timing diagram of wireless communications associated with an AP leaking packets when a STA is in a power save mode.

FIG. 5 shows an example timing diagram 500 of wireless communications associated with an AP leaking packets when a STA is in a power save mode. At the start of a block acknowledgement (BA) window 502, the STA power state 532 is an active mode. While in the active mode, the STA listens to the wireless medium and contends for access to the wireless medium. The STA receives or obtains a last PPDU from the AP before the STA is to enter a power save mode, with the PPDU including a number of packets and having a duration starting at 504 and ending at 510. In the example of FIG. 5, the received or obtained packets 506 include sequence numbers 508 having values between 1 and 9 (inclusive), which may be indicated in a MAC header for each MPDU of the PPDU. After the end of the PPDU (510), the STA informs the AP that the STA is to enter the power save mode (512). In some instances, the STA sends a message with a header including a power management (PM) field set to 1 to indicate entry into the power save mode. The STA enters the power save mode (514). In some instances, the STA's MAC may be configured to perform a power down sequence of one or more components that prevent the STA from listening to the wireless medium via one or more radios during the power save mode. In the example of FIG. 5, the leak guard may be 0 ms.

When the STA is in the power save mode (such as indicated by the STA power state 532), the AP may attempt to transmit leaked packets 516 including sequence numbers 518 having values between 10 and 15 (inclusive) to the STA. For example, due to software bugs, poor channel conditions, or communication lags between the AP's PHY and MAC layers, the AP may transmit a PPDU intended for the STA when the STA is in the power save mode even though the STA informed the AP that the STA was entering the power save mode. At 520, the STA exits the power save mode. In some instances, the STA's MAC may perform a power up sequence of the components previously powered down when waking from the power save mode. As used herein, exiting a power save mode also may be referred to as waking from the power save mode. At 522, the STA informs the AP that the STA has exited the power save mode. In some instances, the STA sends a message with a header including a PM field set to 0 to indicate exit from the power save mode.

The STA receives or obtains a first PPDU from the AP after waking from the power save mode, with the start of the PPDU at 524 and the end of the PPDU at 530. During transmission of the first PPDU, the AP also transmits the retry packets 526, which were originally leaked when the STA was in the power save mode (516). In some implementations, a retry field of a MAC header of the PPDU indicates whether a MPDU is a retry packet 526. In this manner, the STA may determine whether one or more of the packets are retry packets 526 based on the respective retry fields. In some implementations, the STA may determine whether the AP leaked the packets based on a retry field in the first PPDU (such as described below with reference to FIG. 10). The AP also may transmit new packets 528 in the first PPDU. In the example of FIG. 5, the retry packets 526 are associated with sequence numbers having values between 10 and 15, inclusive, and the new packets 528 are associated with sequence numbers having values between 16 and 18, inclusive.

As shown, the sequence numbers of packets received or obtained by the STA are in sequence before and after the power save mode. However, the packets received by the STA may be out-of-order. In some instances, the AP may retransmit the leaked packets in a subsequent PPDU after the STA wakes from the power save mode, as illustrated in the example of FIG. 6.

Figure 6:
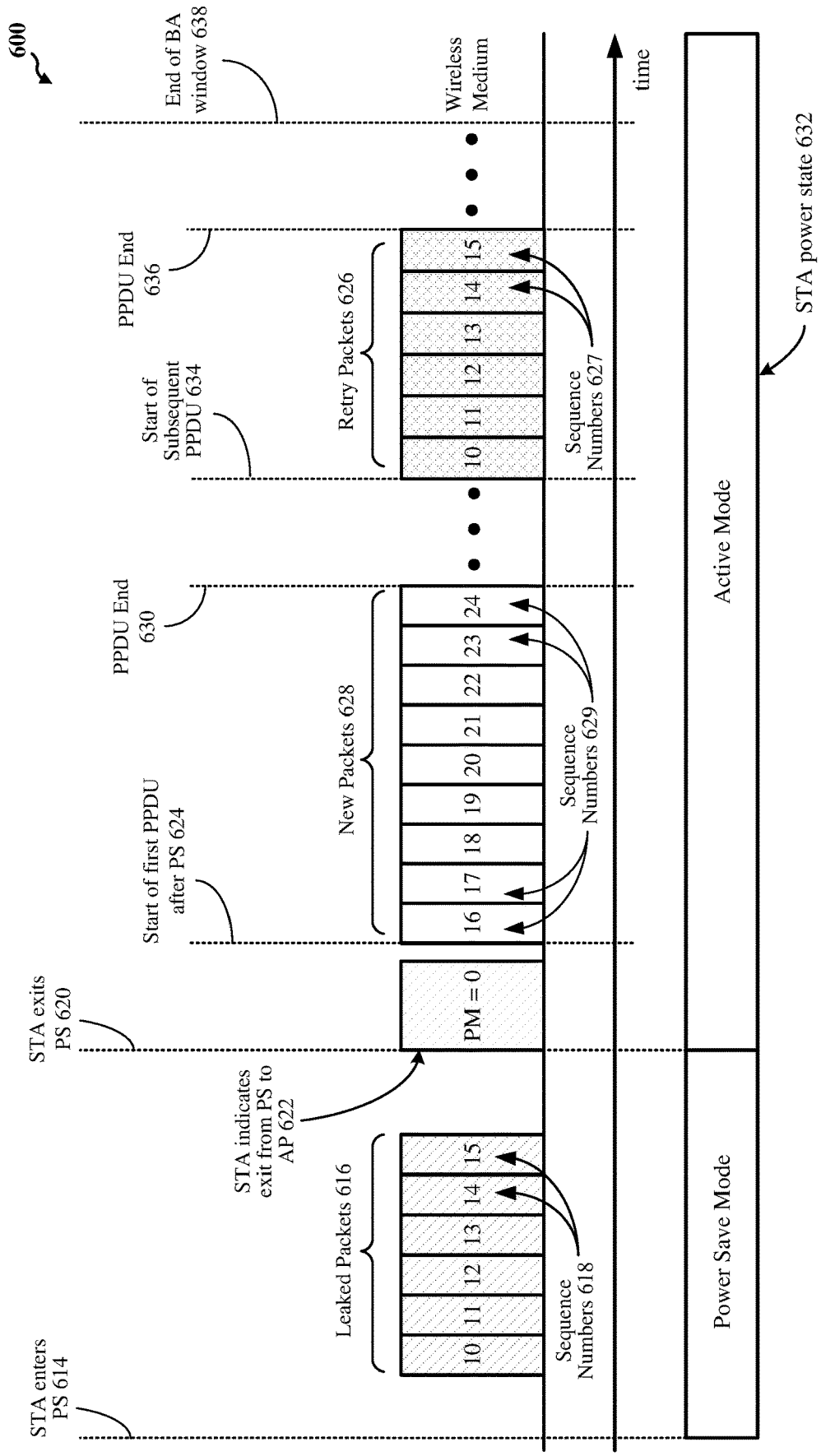
FIG. 6 shows another example timing diagram of wireless communications associated with an AP leaking packets when a STA is in a power save mode.

FIG. 6 shows another example timing diagram 600 of wireless communications associated with an AP leaking packets when a STA is in power save mode. The operations associated with the timing diagram 600 of FIG. 6 may be the same as the operations associated with the timing diagram 500 of FIG. 5 before the STA enters the power save mode (614). That is, the STA receives or obtains the last PPDU with packets 506 having sequence numbers 508 and may provide a message to the AP that includes a PM field set to 1 before entering the power save mode (as indicated by the STA power state 632). When the STA is in the power save mode, the AP leaks packets 616 including sequence numbers 618 having values between 10 and 15, inclusive. The STA exits the power save mode (620), and the STA indicates to the AP that the STA has exited the power save mode (622). The STA receives or obtains a first PPDU from the AP after exiting the power save mode, with the PPDU starting at 624 and ending at 630. The first PPDU in the example timing diagram 600 includes all new packets 628 including sequence numbers 629 having values between 16 and 24, inclusive, and does not include any retry packets. For example, the AP leaked packets 616 with sequence numbers 10-15, and the first PPDU obtained after the STA exited the power save mode includes new packets 628 with sequence numbers 16-24.

The AP may send additional PPDUs before the end of the BA window (638). The AP may retry sending the leaked packets in one or more of the subsequent PPDUs before the end of the BA window. As shown in the timing diagram 600, the STA receives or obtains a subsequent PPDU before the end of the BA window (638), with the start of the PPDU at 634 and the end of the PPDU at 636. The subsequent PPDU may include one or more of the leaked packets as retry packets 626. In the example of FIG. 5, the retry packets 626 are associated with sequence numbers 627 having values between 10 and 15, inclusive. As discussed, a packet may be indicated as a retry packet by a retry field of a MAC header of a MPDU. In some instances, a retry packet obtained in a subsequent PPDU may be a leaked packet. However, the retry packet may be a packet that was sent but not received before the STA entered the power save mode (such as because of wireless medium conditions causing the STA to not receive the packet or correctly decode the packet).

In this manner, whether a packet in a subsequent PPDU is associated with a leaked packet may be based on an indication that the packet is a retry packet (such as based on the retry field) and the sequence number of the packet. For example, as shown in the timing diagram 500 of FIG. 5, the largest sequence number in the last PPDU received before entering the power save mode is 9. For another example, as shown in the timing diagram 600 of FIG. 6, the smallest sequence number in the first PPDU received after exiting the power save mode is 16. The difference between the sequence numbers being greater than one (16–9 equals 7) may indicate that one or more packets may have been leaked by the AP. In some implementations, the STA may not determine that the AP leaked one or more packets until the STA identifies the largest sequence number in the last PPDU (such as 9 in the example) and the smallest sequence number in the first PPDU (such as 16 in the example). For example, the STA may obtain a sequence number from one or more of the retry packets 626, and the STA may determine that the sequence number is between the smallest and largest sequence numbers to determine that the AP leaked one or more packets. Determining whether an AP is leaky based on information in one or more subsequent PPDUs is described below with reference to FIG. 11.

In some other implementations, the AP may not attempt to resend leaked packets. In some instances, the STA may not obtain retry packets from the AP, and the STA may not determine that the AP is leaky based on the sequence numbers of obtained packets.

Figure 7:
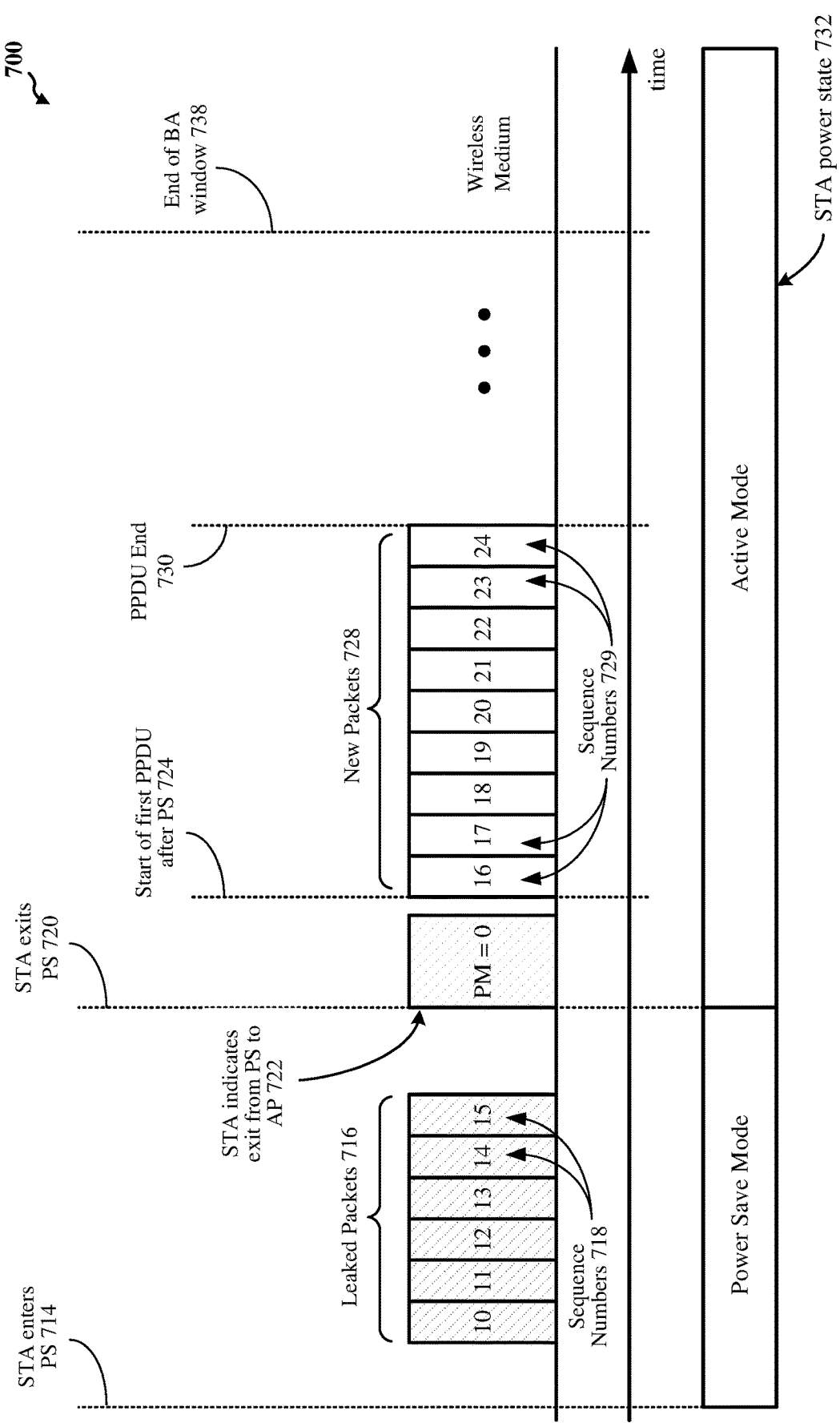
FIG. 7 shows another example timing diagram of wireless communications associated with an AP leaking packets when a STA is in a power save mode.

FIG. 7 shows another example timing diagram 700 of wireless communications associated with an AP leaking packets when a STA is in a power save mode. The operations performed in the timing diagram 700 may be the same as the operations performed in the timing diagram 500 of FIG. 5 before the STA enters the power save mode (714). That is, the STA receives or obtains the last PPDU with packets 506 having sequence numbers 508, and may provide a message to the AP that includes a PM field set to 1 before entering the power save mode (as indicated by the STA power state 732). When the STA is in the power save mode, the AP leaks packets 716 including sequence numbers 718 having values between 10 and 15, inclusive. The STA exits the power save mode (720), and the STA indicates to the AP that the STA has exited the power save mode (722). The STA receives or obtains a first PPDU from the AP after exiting the power save mode, with the PPDU starting at 724 and ending at 730. The first PPDU in the example timing diagram 700 includes all new packets 728 including sequence numbers 729 having values between 16 and 24, inclusive, and does not include any retry packets. For example, the AP leaked packets 716 with sequence numbers 10-15, and the first PPDU obtained after the STA exited the power save mode includes new packets with sequence numbers 16-24.

In contrast to the timing diagram 600 in FIG. 6, the timing diagram 700 of FIG. 7 indicates that the STA does not receive or obtain a subsequent PPDU including one or more retry packets before the end of the BA window (738). In another example, the STA may receive or obtain another PPDU that does not include retry packets with a sequence number between the largest sequence number in a MPDU carried in the last PPDU received before entering the power save mode and the smallest sequence number obtained in a MPDU carried in the first PPDU received after exiting the power save mode. In some implementations when a retry packet with a sequence number between the largest sequence number and the smallest sequence number is not received or otherwise obtained during the BA window, adjusting the leak guard may be based on the number of times after waking from the power save mode that the difference in the sequence numbers is greater than one. For example, the STA may adjust the leak guard or determine that an AP is leaky based on the difference between the largest sequence number in a PPDU received before a power save mode and a smallest sequence number in a PPDU received after the power save mode being greater than one occurring a threshold number of times. In one example, the STA may determine the difference to be greater than one for a threshold number N of consecutive instances of the STA waking from a power save mode (with the integer N being configurable), and may adjust the leak guard based on the configured value of N. In some instances, the STA may increase the leak guard by a relatively large amount when the configured value of N is relatively high, and may increase the leak guard by a relatively small amount when the configured value of N is relatively low.

In the example timing diagrams 500, 600, and 700 of FIGS. 5, 6, and 7, respectively, the packets are received or obtained in order by the STA. That is, none of the packets transmitted by the AP are received or obtained out of order except for a retry packet associated with a leaked packet (such as in FIG. 6). In some other instances, the STA may receive or obtain packets out of order.

Figure 8:
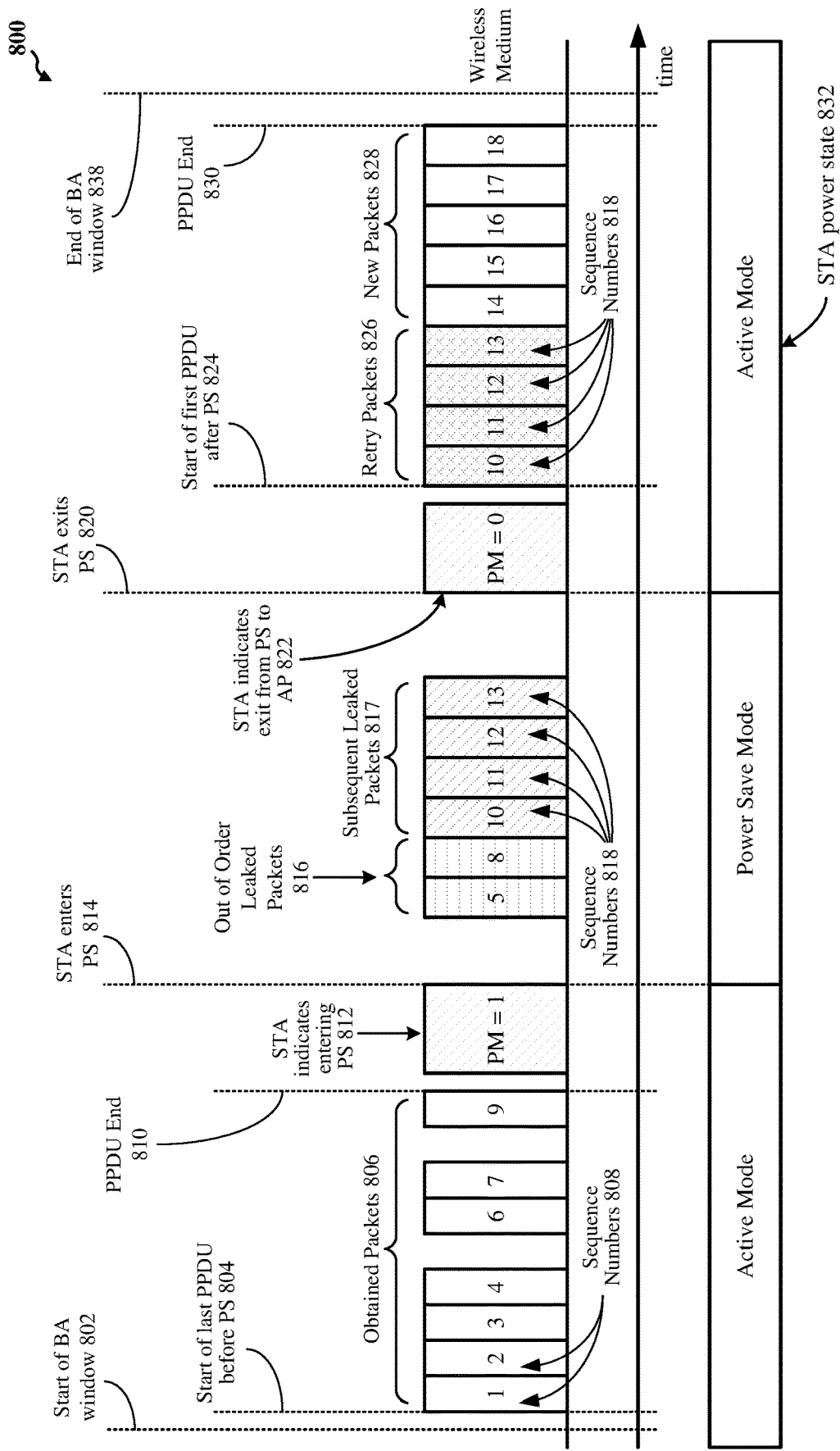
FIG. 8 shows another example timing diagram of wireless communications associated with an AP leaking packets when a STA is in a power save mode.

FIG. 8 shows another example timing diagram 800 of wireless communications associated with an AP leaking packets when a STA is in a power save mode. In the example timing diagram 800, some intermediate packets may not be obtained before the STA receives or obtains subsequent packets. For example, the AP may transmit packets out of order, with one or more intermediate packets to be included in one or more subsequent PPDUs.

In the example timing diagram 800, the BA window begins at 802. A last PPDU before the STA enters a power save mode (indicated by STA power save state 832) is obtained, with the start of the PPDU at 804 and the end of the PPDU at 810. The PPDU includes obtained packets 806 with sequence numbers 808 having values of 1-4, 6-7, and 9. As shown, the obtained packets 806 do not include packets with sequence numbers 5 or 8. For example, the packets may be transmitted by the AP in a subsequent PPDU.

The STA indicates to the AP that the STA is to enter the power save mode (812), and the STA enters the power save mode (814) before receiving or obtaining the missing packets. In this manner, the AP may transmit the missing packets when the STA is in the power save mode. For example, the AP may transmit a PPDU including the out of order leaked packets 816 (with sequence numbers "5" and "8") and the subsequent leaked packets 817 including sequence numbers 818 having values between 10 and 13, inclusive.

At 820, the STA exits from the power save mode. At 822, the STA indicates to the AP that the STA has exited the power save mode. The STA receives or obtains a first PPDU from the AP after waking from the power save mode, with the start of the PPDU at 824 and the end of the PPDU at 830. During transmission of the first PPDU, the AP also transmits the retry packets 826 associated with sequence numbers 818, which were originally leaked when the STA was in the power save mode (817). The AP also may transmit new packets 828 in the first PPDU before the end of the BA window (838).

While the example timing diagram 800 in FIG. 8 illustrates leaked packets 817 being retransmitted by the AP when the STA is in an active mode, in some other implementations, the AP may not retransmit the leaked packets 817, or may transmit only leaked packets that were out of order. As such, adjusting the leak guard or determining whether an AP is leaky when packets are received or obtained by the STA out of order may not be accurately determined using retry field indication and sequence numbers from obtained packets. In some instances, the STA may delay entering into a power save mode until all of the out of order packets are obtained. For example, the reorder buffer of the STA's MAC may be configured to withhold obtained packets from the DRU until all previous packets are obtained based on the sequence numbers. If an intermediate packet is missing, the reorder buffer may include the one or more subsequent packets that have been obtained. To delay entry into the power save mode until all out of order packets are obtained, the STA may be configured to enter the power save mode only when the reorder buffer is empty. In this manner, the operations for adjusting the leak guard or for determining whether an AP leaked one or more packets may be independent of whether the packets obtained by the STA are out of order (or not out of order).

As discussed, a wireless communication device (such as a STA or other suitable device) may be configured to adjust a time period to delay entering a power save mode to prevent an AP from leaking packets when the STA is in the power save mode. The flowcharts in FIGS. 9-19, 20A, and 20B illustrate example operations for adjusting the leak guard. While some example operations are illustrated, additional or different operations may be performed (or performed in a different order) for adjusting the leak guard. In addition, although one or more operations may be described with reference to the STA 200 of FIG. 2, in some other implementations, other suitable wireless communication devices may perform some or all of the operations disclosed herein.

Figure 9:
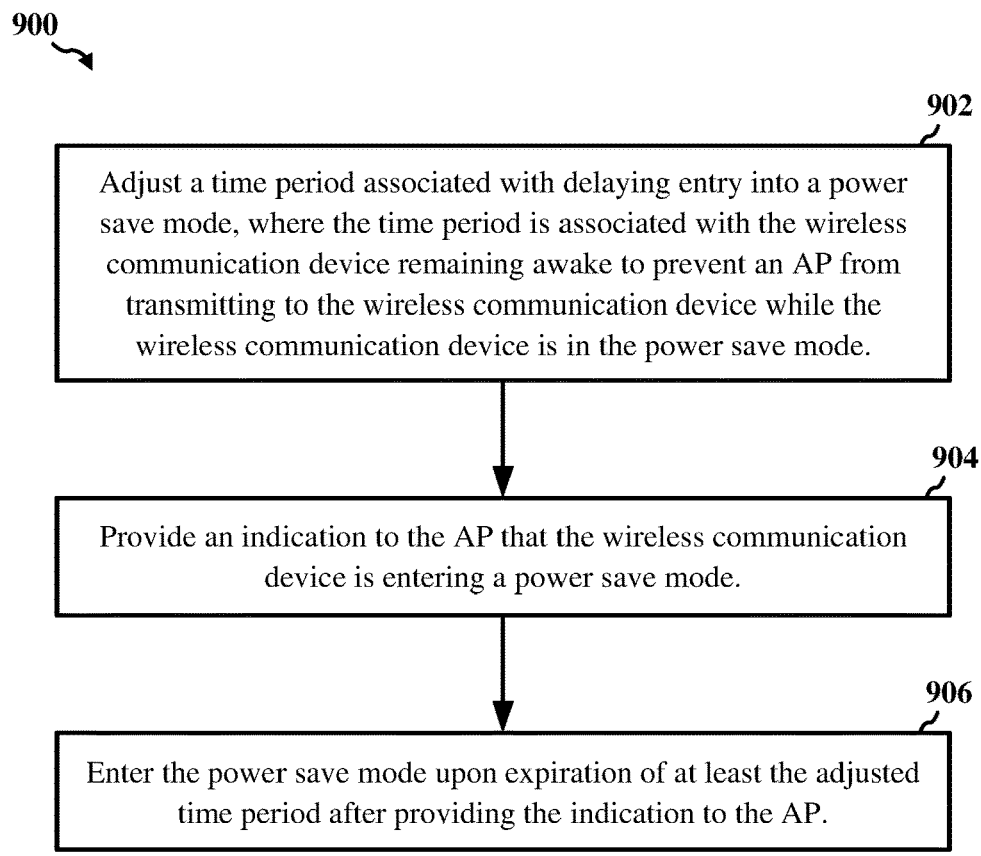
FIG. 9 shows an illustrative flowchart depicting an example operation for wireless communications that support adjusting a time period to delay entering a power save mode.

FIG. 9 shows an illustrative flowchart depicting an example operation 900 for wireless communications that support adjusting a time period to delay entering a power save mode. In some implementations, the operation 900 may be performed by an apparatus of a wireless communication device operating as or within a network node, such as one of the STAs 120a-120i or 200 described with reference to FIGS. 1 and 2, respectively.

At 902, the wireless communication device adjusts a time period associated with delaying entry into a power save mode. As discussed, the time period by which the STA delays entering the power save mode may be referred to herein as a leak guard. The adjusted time delay may be between 0 ms and 5 ms. In some instances, adjusting the time period or leak guard may include switching between two time periods (which may be associated with turning off and turning on the leak guard). In some other instances, adjusting the time period or leak guard may include increasing or decreasing the leak guard to values between and including 0 ms and a maximum value (such as 5 ms or 10 ms). In this manner, the time period for delaying entry into the power save mode may be associated with the wireless communication device remaining awake to prevent the AP from transmitting to the wireless communication device while the wireless communication device is in the power save mode.

At 904, the wireless communication device provides, to the AP, an indication that the wireless communication device is entering the power save mode. In some implementations, the interface 250 of the STA 200 may provide, to the AP, a frame with the PM field set to 1 before entering the power save mode.

At 906, the wireless communication device may enter the power save mode upon expiration of at least the adjusted time period after providing the indication to the AP. In some implementations, the processing system 260 may delay the STA's entry into the power save mode until expiration of at least the adjusted time delay after providing the frame with the PM field set to 1 to the AP. In this manner, the STA 200 is prevented from entering the power save mode before expiration of the adjusted time delay, thereby keeping the STA 200 awake to receive transmissions from the AP.

Determining when and how to adjust the leak guard may be based on whether the AP leaked packets during a previous instance of the power save mode by the STA 200. In some implementations, the STA 200 may adjust the leak guard based on one or more operations indicating whether (or not) the AP leaked one or more packets when the STA 200 was previously in a power save mode. Whether the AP attempted to transmit to the STA 200 while the STA 200 was previously in the power save mode may be determined using information included in or carried by one or more PPDUs obtained by the STA after waking from the power save mode. For example, if the time period is 0 ms (such as the leak guard being turned off), the STA 200 may enter the power save mode as soon as providing the indication to enter the power save mode to the AP. For another example, if the time period is 5 ms, the STA 200 waits at least 5 ms after providing the indication to the AP before entering the power save mode.

Figure 10:
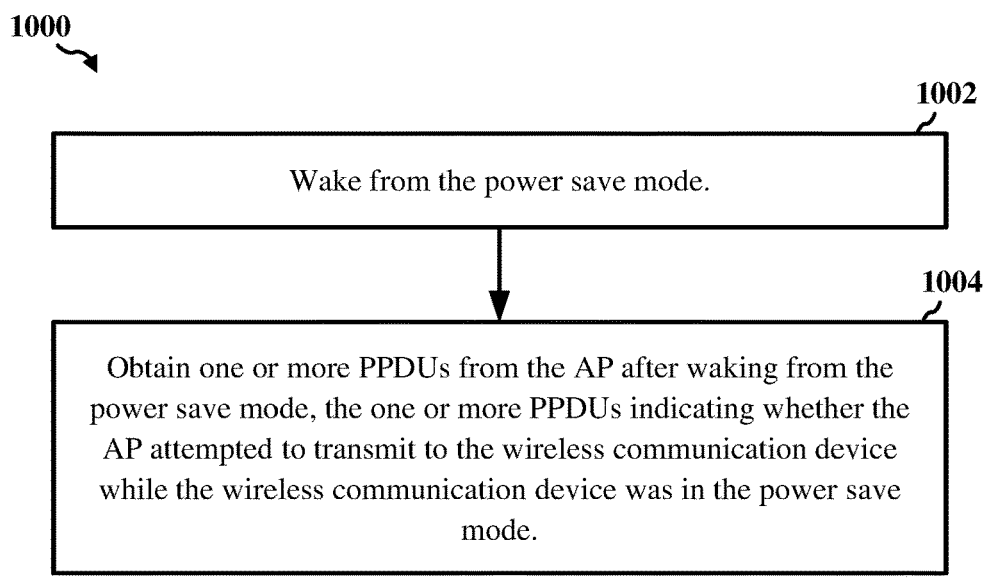
FIG. 10 shows an illustrative flowchart depicting another example operation for wireless communications that support adjusting the time period to delay entering the power save mode.

FIG. 10 shows an illustrative flowchart depicting another example operation 1000 for wireless communications that support adjusting the time period to delay entering the power save mode. The operation 1000 may be performed by an apparatus of a wireless communication device operating as or within a network node, such as one of the STAs 120a-120i or 200 described with reference to FIGS. 1 and 2, respectively. In some implementations, the operation 1000 may be performed after entering the power save mode at 906 in FIG. 9.

For example, at 1002, the wireless communication device wakes from the power save mode. At 1004, the wireless communication device obtains one or more PPDUs from the AP after waking from the power save mode. In some implementations, the one or more PPDUs may indicate whether the AP attempted to transmit to the wireless communication device while the wireless communication device was in the power save mode. In some instances, the indication of whether the AP attempted to transmit to the wireless communication device while the wireless communication device was in the power save mode may be included in a retry field in a header of at least one of the one or more PPDUs obtained from the AP. In some other instances, the retry field may indicate that one or more MPDUs are being resent by the AP.

Figure 11:
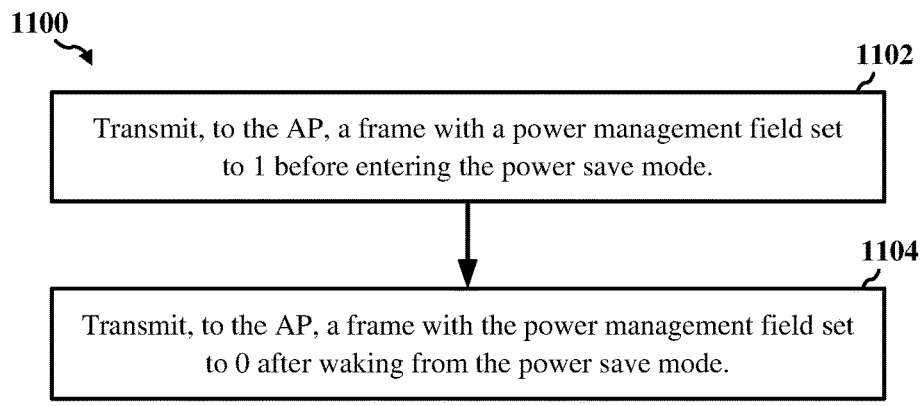
FIG. 11 shows an illustrative flowchart depicting an example operation for wireless communications that support providing indications of a power save mode to an AP.

FIG. 11 shows an illustrative flowchart depicting an example operation 1100 for wireless communications that support providing indications of power save mode to an AP. The operation 1100 may be performed by an apparatus of a wireless communication device operating as or within a network node, such as one of the STAs 120a-120i or 200 described with reference to FIGS. 1 and 2, respectively. In some implementations, the operation 1100 may be associated with entering the power save mode at 906 in FIG. 9.

For example, at 1102, the wireless communication device transmits, to the AP, a frame with a power management field carrying a power management (PM) bit set to 1 before entering the power save mode. At 1104, the wireless communication device transmits, to the AP, a frame with the power management field carrying a PM bit set to 0 after waking from the power save mode. In this way, the AP may be informed when the wireless communication device is entering into the power save mode (such as indicated by the PM bit set to 1), and may be informed when the wireless communication device is exiting from the power save mode (such as indicated by the PM bit set to 0).

Figure 12:
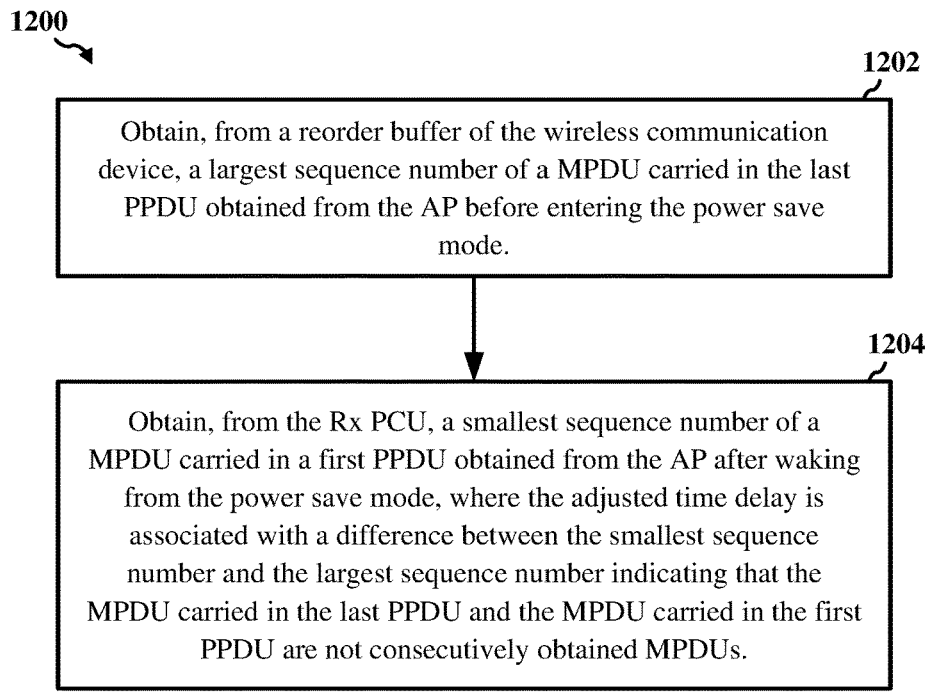
FIG. 12 shows an illustrative flowchart depicting another example operation for wireless communications that support adjusting the time period for delaying entry into the power save mode based on sequence numbers of one or more physical layer protocol data units (PPDUs).

FIG. 12 shows an illustrative flowchart depicting an example operation 1200 for wireless communications that support adjusting the time period for delaying entry into the power save mode based on sequence numbers of one or more PPDUs. The operation 1200 may be performed by an apparatus of a wireless communication device operating as or within a network node, such as one of the STAs 120a-120i or 200 described with reference to FIGS. 1 and 2, respectively. In some implementations, the operation 1200 may be performed after entering the power save mode at 906 in FIG. 9.

For example, at 1202, the wireless communication device obtains, from a reorder buffer of the wireless communication device, the largest sequence number of a MPDU carried in the last PPDU obtained from the AP before entering the power save mode. At 1204, the wireless communication device obtains, from an Rx PCU of the wireless communication device, the smallest sequence number of a MPDU carried in a first PPDU obtained from the AP after waking from the power save mode. In some instances, the adjusted time delay may be associated with or based on a difference between the smallest sequence number and the largest sequence number indicating that the MPDU carried in the last PPDU and the MPDU from the first PPDU are not consecutively obtained or received MPDUs.

Figure 13:
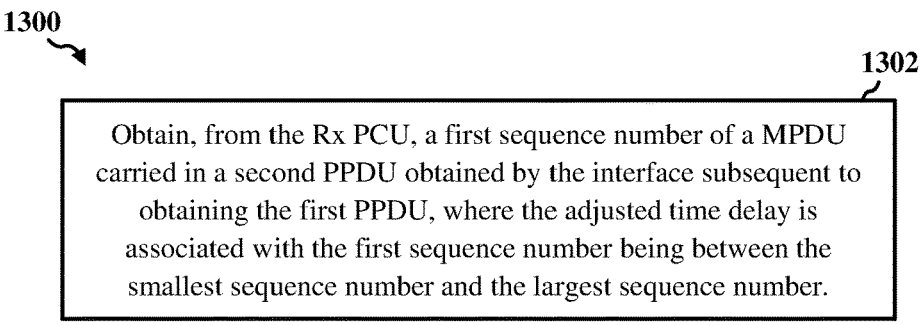
FIG. 13 shows an illustrative flowchart depicting another example operation for wireless communications that support adjusting the time period for delaying entry into the power save mode based on sequence numbers of one or more PPDUs.

FIG. 13 shows an illustrative flowchart depicting another example operation 1300 for wireless communications that support adjusting the time period for delaying entry into the power save mode based on sequence numbers of one or more PPDUs. The operation 1300 may be performed by an apparatus of a wireless communication device operating as or within a network node, such as one of the STAs 120a-120i or 200 described with reference to FIGS. 1 and 2, respectively. In some implementations, the operation 1300 may be performed after obtaining the smallest sequence number of the MPDU carried in the first PPDU at 1204 in FIG. 12. For example, at 1302, the wireless communication device obtains, from the Rx PCU, a first sequence number of a MPDU carried in a second PPDU obtained by the interface subsequent to obtaining the first PPDU. In some instances, the adjusted time delay may be associated with or based on the first sequence number being between the smallest sequence number and the largest sequence number.

Figure 14:
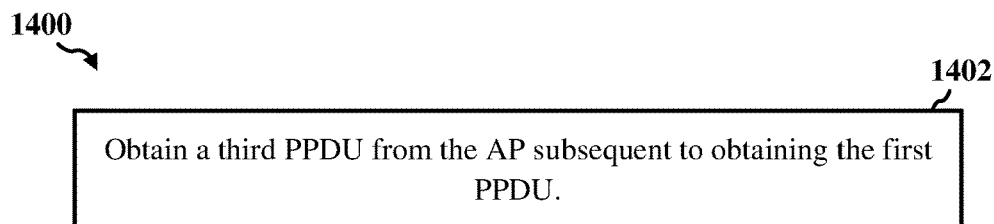
FIG. 14 shows an illustrative flowchart depicting an example operation for wireless communications that support adjusting the time period for delaying entry into the power save mode based on sequence numbers of one or more PPDUs.

FIG. 14 shows an illustrative flowchart depicting another example operation 1400 for wireless communications that support adjusting the time period for delaying entry into the power save mode based on sequence numbers of one or more PPDUs. The operation 1400 may be performed by an apparatus of a wireless communication device operating as or within a network node, such as one of the STAs 120a-120i or 200 described with reference to FIGS. 1 and 2, respectively. In some implementations, the operation 1400 may be performed after entering the power save mode at 906 in FIG. 9. For example, at 1402, the wireless communication device obtains a third PPDU from the AP subsequent to obtaining the first PPDU. In some instances, the third PPDU is obtained after an end of a block acknowledgement (BA) window associated with the first PPDU, the second PPDU is obtained before the end of the BA window, and the adjusted time delay is not associated with sequence numbers of MPDUs in the third PPDU being between the smallest sequence number and the largest sequence number.

Figure 15:
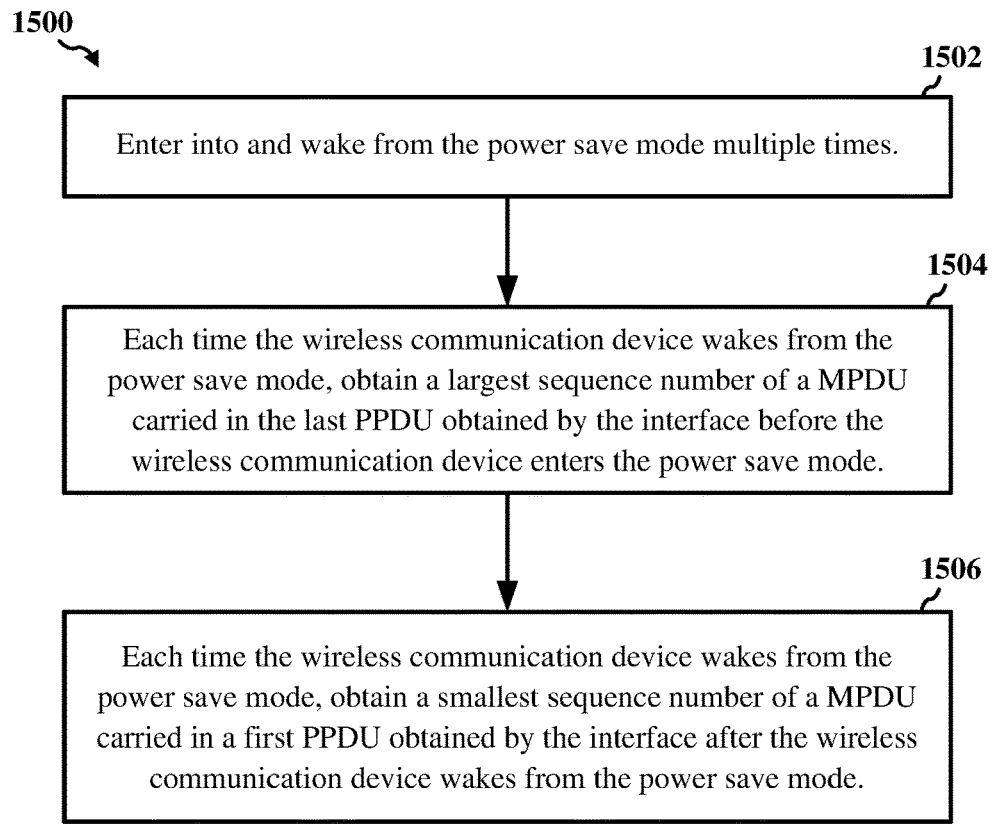
FIG. 15 shows an illustrative flowchart depicting an example operation for wireless communications that support entering and exiting power save mode.

FIG. 15 shows an illustrative flowchart depicting an example operation 1500 for wireless communications that support entering and exiting power save mode. The operation 1500 may be performed by an apparatus of a wireless communication device operating as or within a network node, such as one of the STAs 120a-120i or 200 described with reference to FIGS. 1 and 2, respectively. In some implementations, the operation 1500 may be performed after entering the power save mode at 906 in FIG. 9.

For example, at 1502, the wireless communication device enters into and wakes from the power save mode multiple times. At 1504, for each time the wireless communication device wakes from the power save mode, the wireless communication device obtains, from the reorder buffer, the largest sequence number of a MPDU carried in the last PPDU obtained by the interface before the wireless communication device enters the power save mode. At 1506, for each time the wireless communication device wakes from the power save mode, the wireless communication device obtains, from the Rx PCU, the smallest sequence number of a MPDU carried in a first PPDU obtained by the interface after the wireless communication device wakes from the power save mode.

In some implementations, for a threshold number of consecutive times the wireless communication device wakes from the power save mode, the adjusted time delay is associated with a difference between the smallest sequence number and the largest sequence number indicating that the MPDU carried in the last PPDU and the MPDU from the first PPDU are not consecutively obtained or received MPDUs. In some instances, obtaining the largest sequence number and the smallest sequence number includes obtaining a type-length-value (TLV) encoded message including the largest sequence number, the smallest sequence number, and retry field information.

Figure 16:
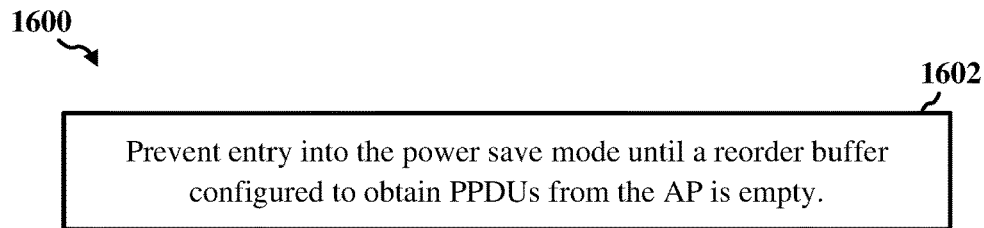
FIG. 16 shows an illustrative flowchart depicting an example operation for wireless communications that support delaying entering power save mode.

FIG. 16 shows an illustrative flowchart depicting an example operation 1600 for wireless communications that support delaying entering power save mode. The operation 1600 may be performed by an apparatus of a wireless communication device operating as or within a network node, such as one of the STAs 120a-120i or 200 described with reference to FIGS. 1 and 2, respectively. In some implementations, the operation 1600 may be performed in conjunction with entering the power save mode at 906 in FIG. 9. For example, at 1602, the wireless communication device may not enter the power save mode until the reorder buffer (which is configured to receive or obtain PPDUs from the AP) is empty.

Figure 17:
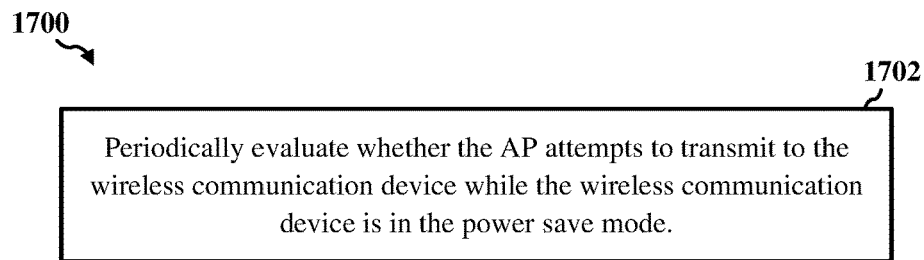
FIG. 17 shows an illustrative flowchart depicting another example operation for wireless communications that support entering and exiting power save mode.

FIG. 17 shows an illustrative flowchart depicting an example operation 1700 for wireless communications that support entering and exiting power save mode. The operation 1700 may be performed by an apparatus of a wireless communication device operating as or within a network node, such as one of the STAs 120a-120i or 200 described with reference to FIGS. 1 and 2, respectively. In some implementations, the operation 1700 may be performed after entering the power save mode at 906 in FIG. 9. For example, at 1702, the wireless communication device may periodically evaluate whether the AP attempts to transmit to the wireless communication device while the wireless communication device is in the power save mode.

Figure 18:
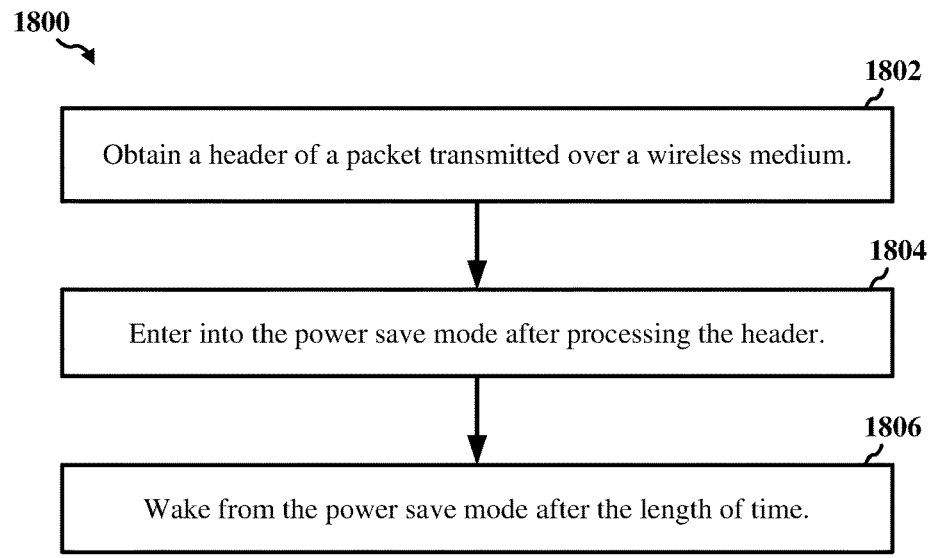
FIG. 18 shows an illustrative flowchart depicting another example operation for wireless communications that support entering and exiting power save mode.

FIG. 18 shows an illustrative flowchart depicting another example operation 1800 for wireless communications that support entering and exiting power save mode. The operation 1800 may be performed by an apparatus of a wireless communication device operating as or within a network node, such as one of the STAs 120a-120i or 200 described with reference to FIGS. 1 and 2, respectively. In some implementations, the operation 1800 may be performed in conjunction with the operation 900 of FIG. 9.

For example, at 1802, the wireless communication device may obtain a header of a packet transmitted over a wireless communication medium. At 1804, the wireless communication device may enter the power save mode after processing the header. In some instances, a recipient address in the header does not match an address of the wireless communication device, and a length of time of the power save mode is associated with an amount of time the wireless communication medium is occupied during transmission of the packet. At 1806, the wireless communication device may wake from the power save mode after the length of time of the power save mode. In some implementations, a recipient address in the header does not match an address of the wireless communication device, and a length of time of the power save mode is associated with an amount of time the wireless communication medium is occupied during transmission of the packet. In some instances, adjusting the time period may include disabling or enabling entering the power save mode by the wireless communication device.

Figure 19:
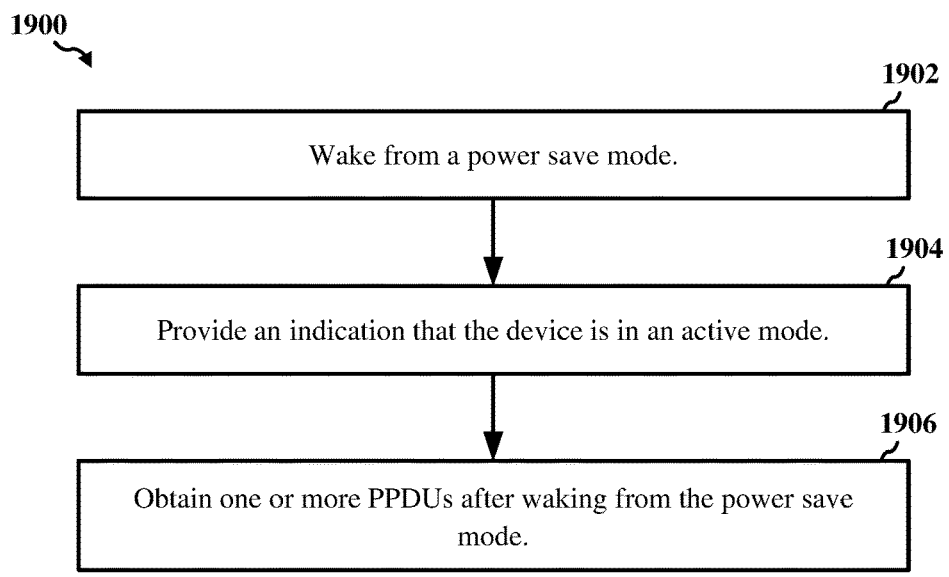
FIG. 19 shows an illustrative flowchart depicting an example operation for wireless communications that support adjusting a time period to delay entering a power save mode based on a first PPDU obtained after waking from a power save mode.

FIG. 19 shows an illustrative flowchart depicting an example operation 1900 for wireless communications that support adjusting a time period to delay entering a power save mode based on a first PPDU obtained after waking from a power save mode. In some implementations, the operation 1900 may be performed by an apparatus of a wireless communication device operating as or within a network node, such as one of the STAs 120a-120i or 200 described with reference to FIGS. 1 and 2, respectively.

At 1902, the wireless communication device wakes from a power save mode. In some implementations, the processing system 260 of the STA 200 causes the STA 200 to wake from the power save mode. At 1904, the wireless communication device provides an indication, to the AP, that the device is in an active mode (and thus awake from the power save mode). In some implementations, the interface 250 of the STA 200 provides a frame with the PM field set to 0 to the AP to indicate that the STA 200 is awake from the power save mode. At 1906, the wireless communication device receives or obtains one or more PPDUs after waking from the power save mode.

In some implementations, the indication of whether the AP attempted to transmit to the wireless communication device while the wireless communication device is in the power save mode may be provided in or carried by one or more PPDUs received or obtained from the AP. In some instances, the indication of whether the AP attempted to transmit to the wireless communication device while the wireless communication device was in the power save mode may be included in a retry field in a header of at least one of the one or more PPDUs obtained from the AP. In some other instances, the retry field may indicate that MPDUs are being resent by the AP.

Figure 20A:
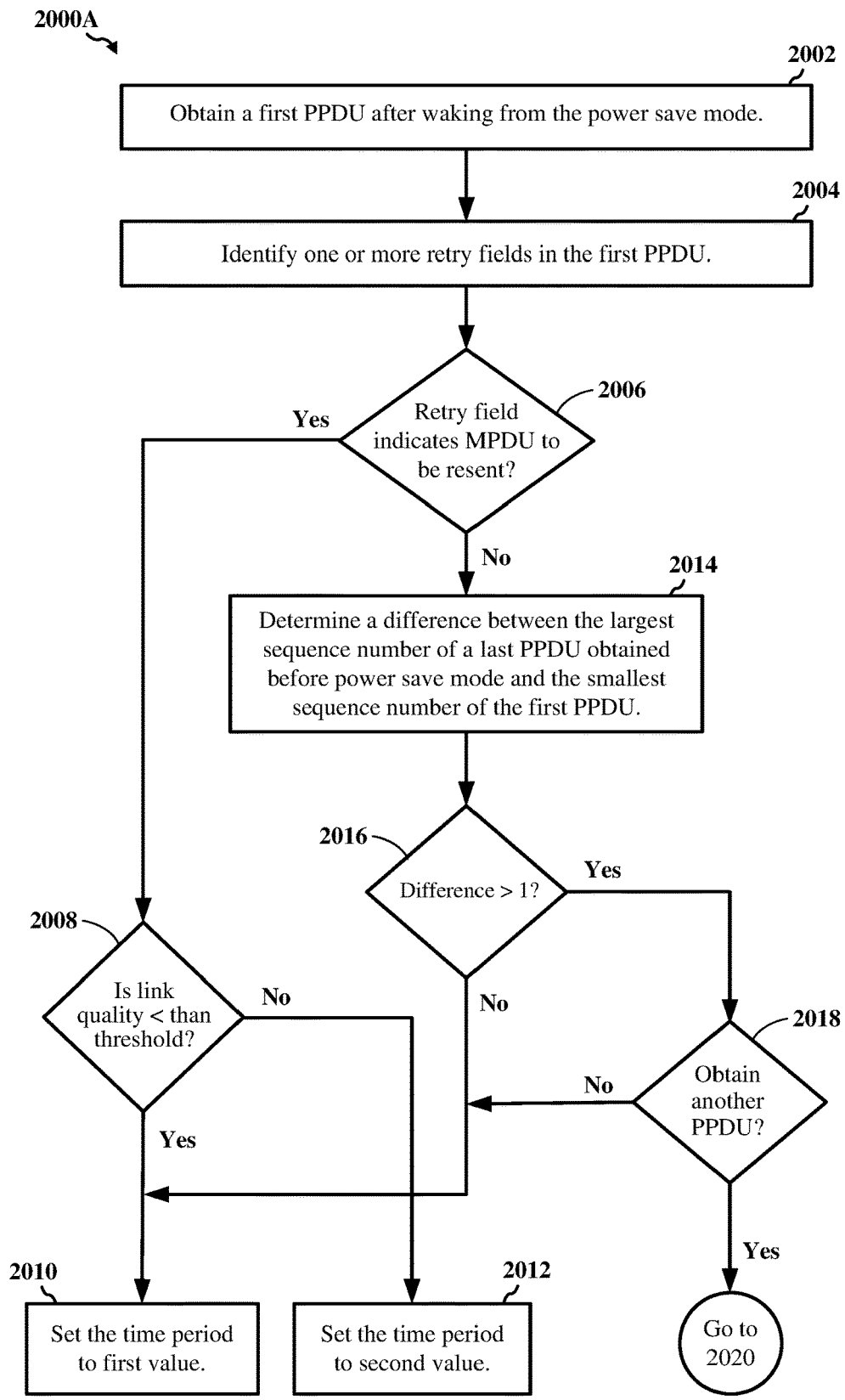
FIGS. 20A and 20B show an illustrative flowchart depicting another example operation for wireless communications that support adjusting the time period to delay entering power save mode.

FIG. 20A shows an illustrative flowchart depicting another example operation 2000A for wireless communications that support entering and exiting power save mode. The operation 2000A may be performed by an apparatus of a wireless communication device operating as or within a network node, such as one of the STAs 120a-120i or 200 described with reference to FIGS. 1 and 2, respectively. In some implementations, the operation 2000A may be an example of adjusting the leak guard based on the first PPDU of the one or more PPDUs obtained at 1906.

At 2002, the wireless communication device obtains a first PPDU after waking from the power save mode. For example, the interface 250 of the STA 200 receives or obtains the first PPDU from the AP. At 2004, the wireless communication device identifies one or more retry fields in the first PPDU. The first PPDU includes one or more MPDUs. In some implementations, the Rx PCU 306 of FIG. 3 of the wireless communication device decodes the PPDU to identify MAC headers of the one or more MPDUs and to identify the retry fields in the MAC headers. At 2006, the wireless communication device determines whether a retry field indicates that a MPDU is being resent. For example, the retry field information from the Rx PCU 306 may be encoded into a message obtained by the processing system 260 of the STA 200. The processing system 260 may determine whether any of the retry fields in the PPDU are set to 1 to indicate that the associated MPDU is being resent by the AP.

The indication of an MPDU being resent by the AP in the first PPDU after the wireless communication device wakes from the power save mode may indicate whether the AP is leaky. In some implementations, a retry field set to 1 in the first PPDU may indicate that the AP is resending a leaked packet. In some instances, the AP may resend a packet based on a link quality between the AP and the wireless communication device. For example, the AP may transmit a packet before the wireless communication device enters the power save mode, and the received signal strength of the packet may not be sufficient for the wireless communication device to successfully obtain and decode the packet.

If a retry field indicates that an MPDU is being resent, the wireless communication device may determine whether a link quality between the AP and the wireless communication device is less than a threshold, at 2008. In some instances, the wireless communication device can use one or more of the received signal strength indicator (RSSI) of the transmitted packet, the modulation and coding scheme (MCS) used to transmit the packet, the packet error rate (PER), channel state information (CSI), or the bandwidth of the wireless medium to determine the link quality. If the link quality is less than the threshold, the wireless communication device sets the time period to delay entering a power save mode to a first value, at 2010. Conversely, if the link quality is not less than the threshold, the wireless communication device sets the time period to a second value, at 2012. In some instances, the processing system may adjust the leak guard between the first and second values based on the RSSI being greater than or less than a configured threshold.

In some implementations, the first value may be associated with the AP not being leaky, and the second value may be associated with the AP being leaky. When the AP is not leaky, the wireless communication device may not delay entering the power save mode. When the AP is leaky, the wireless communication device may delay entering the power save mode to prevent missing leaked packets transmitted by the AP. In some instances, the first value may be 0 ms and the second value may be 5 ms. The first and second values may be any suitable time periods as long as the first value is less than the second value.

In some other implementations, the time period may be increased or decreased by an amount rather than setting the time period to the first value or the second value. In this manner, the leak guard may be increased or decreased to a specific time period associated with preventing the AP from leaking packets.

If none of the retry fields indicate that a MPDU is being resent at 2006, the wireless communication device determines a difference between a largest sequence number from a last PPDU obtained before entering the power save mode and the smallest sequence number from the first PPDU obtained after waking from the power save mode, at 2014. In some instances, the wireless communication device may obtain the largest sequence number from the last PPDU obtained before entering the power save mode, and may obtain the smallest sequence number from the first PPDU obtained after waking from the power save mode. For example, the Rx PCU 306 may decode the sequence numbers from the MAC sequence control field of the MAC headers in the first PPDU to obtain the smallest sequence number from the first PPDU, and the reorder buffer 308 may obtain the largest sequence number from the last PPDU. The largest and smallest sequence numbers obtained from the first PPDU may be encoded into a message (such as a TLV encoded message).

In some implementations, a TLV encoded message including the smallest sequence number, the largest sequence number, and the retry field information may be created for each PPDU obtained by the interface 250. In this manner, the interface 250 may obtain the last PPDU before entering the power save mode, and the Rx PCU 306 may decode the sequence numbers from the MAC sequence control field of the MAC headers in the last PPDU. The largest sequence number and the smallest sequence number may be included in the TLV encoded message associated with the last PPDU. The processing system 260 may obtain the largest sequence number of the MPDU carried in the last PPDU obtained before entering the power save mode from the reorder buffer. In some instances, the processing system 260 may be configured to store the largest sequence number while the STA 200 is in the power save mode.

At 2016, the wireless communication device determines whether the difference between the largest sequence number of the MPDU carried in the last PPDU and the smallest sequence number of the MPDU carried in the first PPDU is greater than 1. If the difference is not greater than 1, which may indicate that another sequence number does not exist between the largest sequence number of the MPDU carried in the last PPDU and the smallest sequence number of the MPDU carried in the first PPDU, the wireless communication device may set the time period to the first value, at 2010.

Conversely, if the difference is greater than 1, which may indicate that another sequence number exists between the largest sequence number carried in the last PPDU and the smallest sequence number carried in the first PPDU, the wireless communication device may determine whether another PPDU is to be obtained before the end of the BA window, at 2018. If there is not another PPDU to be obtained before the end of the BA window, the wireless communication device may set the time period to the first value, at 2010. Conversely, if there is another PPDU to be obtained before the end of the BA window, the operation 2000A proceeds to 2020 of FIG. 20B.

Figure 20B:
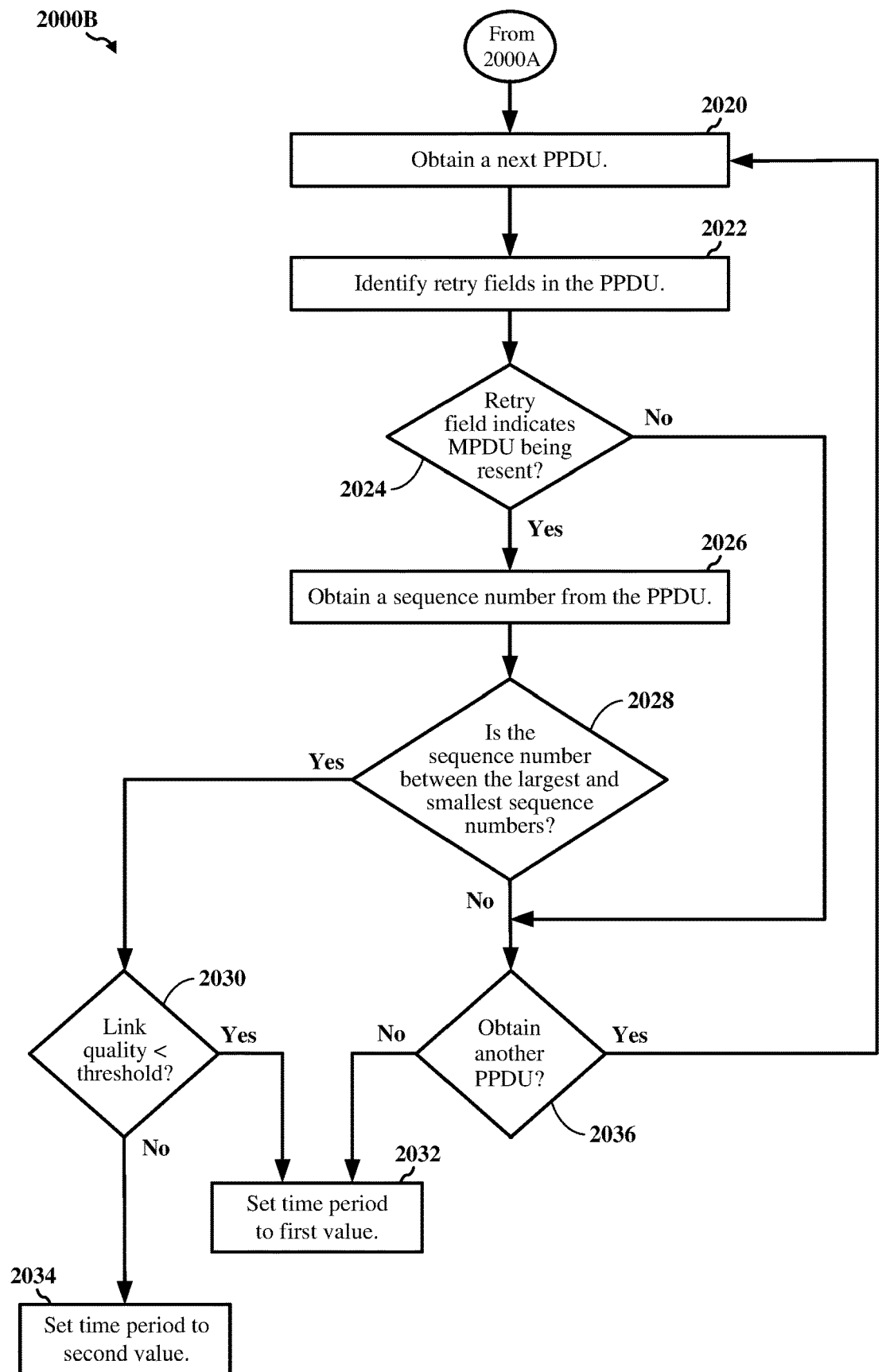

FIG. 20B shows an illustrative flowchart depicting another example operation 2000B for wireless communications that support entering and exiting power save mode. The operation 2000B may be performed by an apparatus of a wireless communication device operating as or within a network node, such as one of the STAs 120a-120i or 200 described with reference to FIGS. 1 and 2, respectively. In some implementations, the operation 2000B may continue from the operation 2000A of FIG. 20A, in particular the "yes" branch of determination step 2018 of FIG. 20A.

At 2020, the wireless communication device receives or obtains a next PPDU from the AP. For example, the interface 250 of the STA 200 may obtain a second PPDU after obtaining the first PPDU. At 2022, the wireless communication device may identify one or more retry fields in the PPDU. For example, the Rx PCU 306 may decode the second PPDU to identify one or more retry fields in the MAC headers. At 2024, the wireless communication device determines whether any of the retry fields indicate that a MPDU is being resent. If one or more of the retry fields indicate that a MPDU is being resent, the wireless communication device obtains a sequence number from the PPDU, at 2026. The wireless communication device determines whether the obtained sequence number is between the largest sequence number carried in the last PPDU obtained before entering the power save mode and the smallest sequence number carried in the first PPDU obtained after waking from the power save mode, at 2028. If the obtained sequence number is between the largest and smallest sequence numbers, which may indicate that the AP is leaky, the wireless communication device determines whether the link quality is less than the threshold, at 2030.

If the link quality is less than the threshold, which may indicate that the packet was resent because of poor link quality rather than a leaky AP, the wireless communication device may set the time period to the first value, at 2032. If the link quality is not less than the threshold, which may indicate that the packet was resent due to a leaky AP, the wireless communication device may set the time period to the second value, at 2034.

If the obtained sequence number is not between the largest and smallest sequence numbers at 2028, or if none of the retry fields indicate that a MPDU is being resent at 2024, the wireless communication device may determine whether there are any additional PPDUs to be obtained before the end of the BA window, at 2036. If there are not any additional PPDUs to be obtained before the end of the BA window, the wireless communication device sets the time period to the first value at 2032. In some implementations, the device listens for additional PPDUs until the end of the BA window. The AP does not attempt to resend leaked packets after the BA window.

At end of the BA window, the wireless communication device may ensure that the leak guard is set to the first value (such as 0 ms). The wireless communication device may receive or obtain a third PPDU subsequent to obtaining the first PPDU and a second PPDU obtained before the end of the BA window. In some instances, the third PPDU is obtained after the end of the BA window associated with the first PPDU (such as during a different BA window). The wireless communication device does not check the retry fields or the sequence numbers of the third PPDU to determine whether the AP is leaky. In this manner, a determination that the AP is leaky is not based on or associated with sequence numbers of MPDUs in the third PPDU being between the smallest sequence number and the largest sequence number used to determine the difference in block 2016 in FIG. 20A.

Although not shown for simplicity in FIGS. 20A-20B, the wireless communication device may prevent entry into the power save mode when the reorder buffer 308 is not empty. As discussed, a non-empty state of the reorder buffer 308 may indicate that one or more preceding packets were missing (such as depicted in the example of FIG. 8). In some implementations, if the reorder buffer 308 is configured to store packets until all preceding packets are obtained and provided to the DRU 310, an empty state of the reorder buffer 308 may indicate that none of the packets preceding the packet having the largest sequence number in the last PPDU obtained before entering the power save mode are missing. In some instances, the wireless communication device also may not enter the power save mode in response to a determination that its receive chain is idle. In this manner, the wireless communication device may determine that the reorder buffer 308 is empty and that its receive chains are idle before entering the power save mode.

In some implementations, the wireless communication device may record or store an identifier of the AP if the AP is determined to be leaky. For example, if the time period is set to the second value at 2012 or at 2034, the processing system 260 of the STA 200 may store the BSSID of the AP in the database 241 of the STA 200. In this manner, the STA 200 can identify APs that have attempted to transmit to the STA 200 while the STA 200 was in the power save mode. In some instances, storage of an AP's BSSID in the database 241 of a respective STA may indicate that the AP is leaky, and an absence of the AP's BSSID in the database 241 of the respective STA may indicate that the AP is not leaky. In some other instances, storage of an AP's BSSID in the database 241 of a respective STA may indicate a relatively high likelihood that the AP is leaky, and an absence of the AP's BSSID in the database 241 of the respective STA may indicate a relatively low likelihood that the AP is leaky. An indication that the AP is not leaky may be associated with adjusting a leak guard associated with the respective STA.

The operations described with reference to FIGS. 20A-20B are based on the reception of PPDUs addressed to the STA 200. In some other implementations, the operations described with reference to FIGS. 20A-20B also may be used to prevent entering the power save mode based on packet power save. Packet power save (PPS) refers to one or more operations in which the STA 200 receives a packet over the wireless medium, determines that the packet is not addressed to the STA 200 based on information included in the packet header, and places selected components of the STA 200 into a low power state for a remainder of the time that the packet transmission occupies the wireless medium. In some instances, the STA 200 may be considered to be in an active mode based on signaling protocols even though the selected components are placed into the low power state such that the STA 200 is prevented from receiving or processing packets. As used herein, placing components into the low power state for PPS may be referred to as a nap state.

For example, when receiving or obtaining a legacy or high throughput (HT) MPDU, the STA 200 may obtain a header including the MPDU's MAC receive address, decode the MAC receive address, and determine that the decoded MAC receive address does not match the address of the STA 200. The STA 200 may place selected components into a low power state while the packet is being transmitted over the wireless medium. When receiving or obtaining an HT A-MPDU, the STA 200 may place the selected components into the low power state based on a cyclic redundancy check fail from a first delimiter, or may place the selected components into the low power state based on a mismatch between the RA field of the HT A-MPDU and the STA's MAC address.

When receiving or obtaining a very high throughput (VHT) SU packet, the STA 200 may place the selected components into the low power state based on a partial association identifier (AID) mismatch and a failed first delimiter CRC, or may place the selected components into the low power state based on a mismatch between the RA field of the VHT SU packet and the STA's MAC address. When receiving or obtaining a VHT MU packet, the STA 200 may place the selected components into the low power state based on a group ID mismatch and a failed first delimiter CRC, or may place the selected components into the low power state based on a mismatch between the RA field of the VHT MU packet and the STA's MAC address.

When receiving or obtaining a high-efficiency (HE) single-user (SU) packet, the STA 200 may place the selected components into the low power state based on a BSS mismatch and a failed first delimiter CRC, or may place the selected components into the low power state based on a mismatch between the RA field of the HE SU packet and the STA's MAC address. When receiving or obtaining an HE MU packet, the STA 200 may place the selected components into the low power state based on a BSS mismatch, based on a STA ID mismatch, based on a failed first delimiter CRC, or based on a mismatch between the RA field of the HE MU packet and the STA's MAC address. In this manner, the STA 200 may conserve power while the wireless medium is occupied with traffic not intended for the STA 200.

Figure 21:
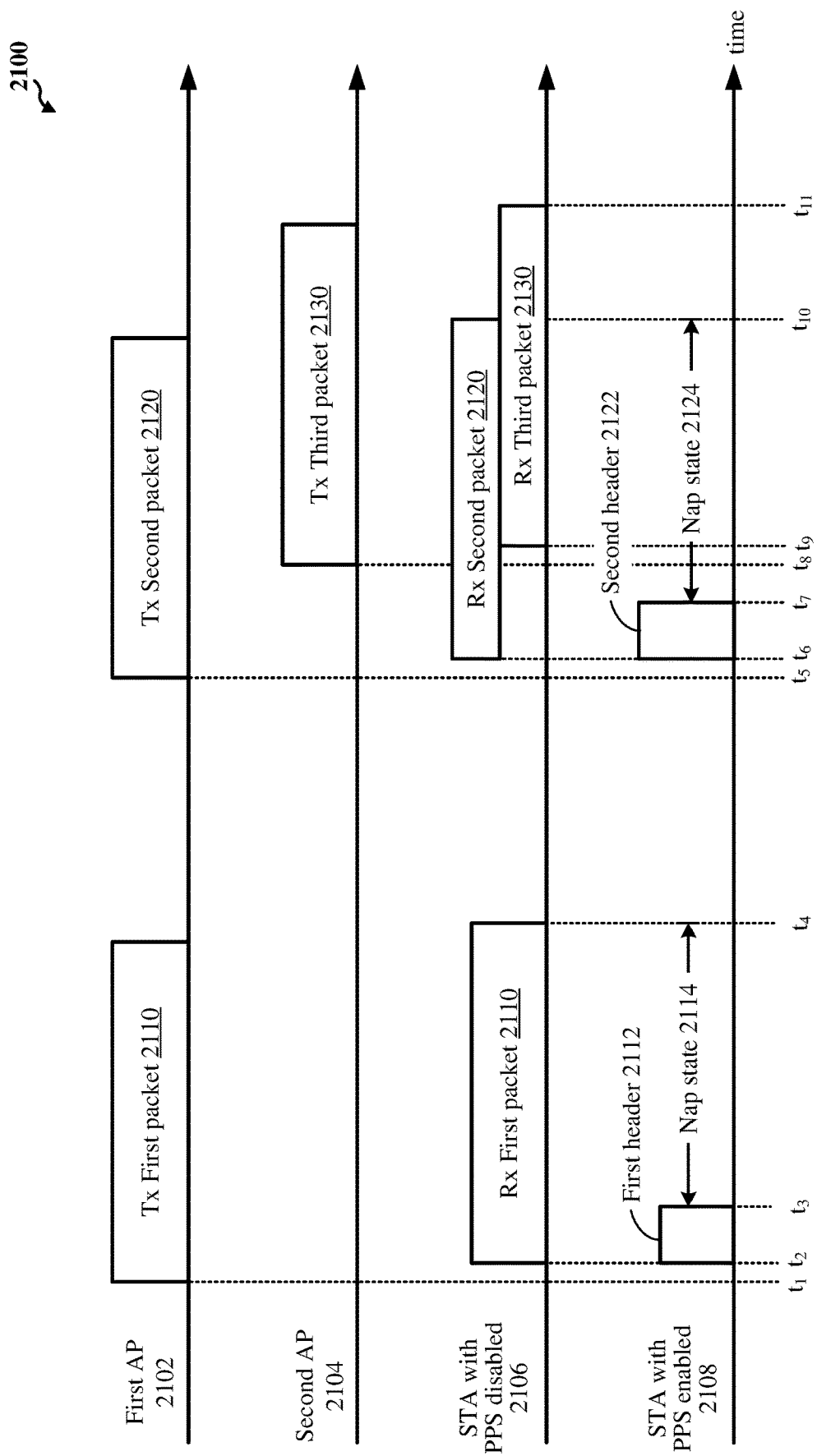
FIG. 21 shows an example timing diagram of a STA transmitting or receiving wireless communications within a wireless range of a first AP and a second AP.

FIG. 21 shows an example timing diagram 2100 of wireless communications that supports nap states. As shown, a STA is within wireless range of a first AP 2102 and a second AP 2104. The STA may have PPS disabled (2106) or enabled (2108). The STA is not associated with a BSS of the first AP 2102, and is associated with a BSS of the second AP 2104. The first AP 2102 transmits a first packet 2110 on the wireless communication medium at time $t_1$. If the STA has PPS disabled (2106), the STA is in an active mode to listen for and receive or obtain the first packet 2110 between times $t_2$ and $t_4$. If the STA has PPS enabled (2108), the STA is in an active mode to obtain the packet header 2112 of the first packet 2110 between times $t_2$ and $t_3$. The STA determines that the first packet 2110 is not intended for the STA, and enters a nap state 2114 at time $t_3$. The STA may remain in the nap state 2114 until time $t_4$. In this manner, the STA conserves power when the STA does not need to listen to the wireless medium. If the second AP 2104 does not transmit to the STA when the STA is in the nap state 2114 based on PPS being enabled, the STA conserves power without missing any packets transmitted from the second AP 2104.

As shown in the example timing diagram 2100, the second AP 2104 transmits a third packet 2130 during transmission of a second packet 2120 by the first AP 2102. For example, the first AP 2102 begins to transmit the second packet 2120 at time $t_5$. During transmission of the second packet 2120, the second AP 2104 begins to transmit the third packet 2130 at time $t_5$. If the STA has PPS disabled (2106), the STA receives or obtains the second packet 2120 between times $t_6$ and $t_{10}$, and also receives or obtains the third packet 2130 between times $t_9$ and $t_{11}$ since the STA did not enter a nap state based on the second packet 2120. If the STA has PPS enabled (2108), the STA obtains the packet header 2122 of the second packet 2120 between times $t_6$ and $t_7$. The STA determines that the second packet 2120 is not intended for the STA, and enters a nap state 2124 at time $t_7$. The STA may remain in the nap state 2124 until time $t_{10}$, for example, such that the STA is unable to receive or obtain the third packet 2130 transmitted from the second AP 2104. Thus, the STA misses the third packet 2130 transmitted from the second AP 2104. In some implementations, the number of missed packets resulting from an enabled PPS may increase as congestion on the wireless medium increases. In this way, the operations associated with determining a leaky AP or adjusting a leak guard also may be used to determine or adjust when the STA is to enter a nap state associated with PPS.

As discussed, the nap state associated with PPS may be different than the power save mode associated with a leaky AP. For example, fewer components of the STA may be placed into a low power state when entering a nap state to reduce the amount of time associated with waking from the nap state. The operations disclosed herein associated with adjusting a leak guard also may be used to adjust when a STA is to enter a nap state. For example, adjusting a leak guard may refer to enabling or disabling PPS to allow or prevent a STA from entering the nap state. For example, a STA with PPS enabled may obtain the largest sequence number of one packet before entering a nap state, and obtain the smallest sequence number of another packet after exiting the nap state. The STA may determine whether a packet received or obtained after the nap state includes a retry field set to 1, or may determine a difference between the largest sequence number and the smallest sequence number. If the retry field is set to 1 and the difference is greater than 1, which may indicate that the second AP 2104 leaked one or more packets (such as based on obtaining a retry packet missed when the STA was in the nap state), the STA may disable PPS. If the second AP 2104 does not transmit a packet that is missed by the STA when the STA is in a nap state, the STA may enable PPS.

As discussed, entering a "power save mode" with reference to a PPS enabled device may refer to the device entering a nap state. In using the operations 1600 or 1700 in FIGS. 16 and 17 to determine whether to enable or disable PPS, block 2010 or block 2032 (entitled "set the time period to the first value") being reached may indicate that the STA is to enable PPS. Block 2012 or block 2034 (entitled "set the time period to the second value") being reached may indicate that the STA is to disable PPS. In this manner, the wireless communication device may determine whether a device may have missed one or more packets from an AP when the device is in the nap state, and the wireless communication device may enable or disable PPS accordingly. As discussed, the wireless communication device periodically may determine (such as every 5 seconds) whether any packets are missed when PPS is enabled or otherwise update whether PPS is to be enabled or disabled by performing the operations described with reference to FIG. 16 and FIG. 17. For example, the wireless communication device may periodically enable PPS and determine whether PPS should remain enabled or should be disabled. In some instances, the wireless communication device may enable PPS every 5 seconds to determine whether PPS is to remain enabled or is to be disabled. In some other instances, if the wireless communication device disables PPS within a certain time period after enabling PPS more than a configured number of times, the wireless communication device may increase the duration of time between disabling and enabling PPS. In this way, if the wireless communication device operates in a persistently congested environment that causes PPS-enabled devices to miss packets, the wireless communication device may disable PPS until the congestion decreases by at least an amount, which may increase throughput of the wireless medium.

The following provides an overview of some aspects of the present disclosure:

Aspect 1: A wireless communication device, including:

a processing system configured to:

adjust a time period to delay entering a power save mode, where the time period is associated with the wireless communication device remaining awake to prevent an access point (AP) from transmitting to the wireless communication device while the wireless communication device is in the power save mode; and an interface configured to:

provide, to the AP, an indication that the wireless communication device is entering the power save mode; and the processing system is further configured to:

enter the wireless communication device into the power save mode upon expiration of at least the adjusted time period after the provided indication.

Aspect 2: The wireless communication device of aspect 1, where:

the processing system is further configured to:

wake the wireless communication device from the power save mode; and the interface is further configured to:

obtain one or more physical layer protocol data units (PPDUs) from the AP after waking from the power save mode, the one or more PPDUs indicating whether the AP attempted to transmit to the wireless communication device while the wireless communication device was in the power save mode.

Aspect 3: The wireless communication device of aspect 2, where the interface is further configured to:

provide, to the AP, a frame with a power management field set to 1 before entering the power save mode; and provide, to the AP, a frame with the power management field set to 0 after waking from the power save mode.

Aspect 4: The wireless communication device of any one or more of aspects 2-3, where the indication of whether the AP attempted to transmit to the wireless communication device while the wireless communication device was in the power save mode is included in a retry field in a header of at least one of the one or more PPDUs obtained from the AP, the retry field indicating that one or more media access control (MAC) protocol data units (MPDUs) are being resent by the AP.

Aspect 5: The wireless communication device of aspect 4, where the processing system is further configured to:

obtain, from a reorder buffer of the wireless communication device, the largest sequence number of a MPDU carried in the last PPDU obtained from the AP before entering the power save mode; and obtain, from a receive (Rx) protocol control unit (PCU) of the wireless communication device, the smallest sequence number of a MPDU carried in a first PPDU obtained from the AP after waking from the power save mode, where the adjusted time delay is associated with a difference between the smallest sequence number and the largest sequence number indicating that the MPDU from the last PPDU and the MPDU from the first PPDU are not consecutive MPDUs.

Aspect 6: The wireless communication device of aspect 5, where the processing system is further configured to:

obtain, from the Rx PCU, a first sequence number of a MPDU carried in a second PPDU obtained by the interface subsequent to obtaining the first PPDU, where the adjusted time delay is associated with the first sequence number being between the smallest sequence number and the largest sequence number.

Aspect 7: The wireless communication device of aspect 6, where the interface is further configured to obtain a third PPDU from the AP subsequent to obtaining the first PPDU, where:

the third PPDU is obtained after an end of a block acknowledgement (BA) window associated with the first PPDU;

the second PPDU is obtained before the end of the BA window; and the adjusted time delay is not associated with sequence numbers of MPDUs in the third PPDU being between the smallest sequence number and the largest sequence number.

Aspect 8: The wireless communication device of any one or more of aspects 6-7, where the processing system is further configured to:

enter the wireless communication device into the power save mode and wake the wireless communication device from the power save mode multiple times; and for each time the wireless communication device wakes from the power save mode:

obtain, from the reorder buffer, the largest sequence number of a MPDU carried in the last PPDU obtained by the interface before the wireless communication device enters the power save mode; and obtain, from the Rx PCU, the smallest sequence number of a MPDU carried in a first PPDU obtained by the interface after the wireless communication device wakes from the power save mode;

where, for a threshold number of consecutive times the wireless communication device wakes from the power save mode, the adjusted time delay is associated with a difference between the smallest sequence number and the largest sequence number indicating that the MPDU from the last PPDU and the MPDU from the first PPDU are not consecutive MPDUs.

Aspect 9: The wireless communication device of any one or more of aspects 5-8, where obtaining the largest sequence number and the smallest sequence number includes obtaining a type-length-value (TLV) encoded message including the largest sequence number, the smallest sequence number, and retry field information.

Aspect 10: The wireless communication device of any one or more of aspects 1-9, where the processing system is further configured to:

prevent the wireless communication device from entering the power save mode until a reorder buffer configured to obtain PPDUs from the AP is empty.

Aspect 11: The wireless communication device of any one or more of aspects 1-10, where the processing system is further configured to:

periodically evaluate whether the AP attempts to transmit to the wireless communication device while the wireless communication device is in the power save mode.

Aspect 12: The wireless communication device of any one or more of aspects 1-11, where the processing system is further configured to:

store a basic service set identifier (BSSID) of the AP in a database of the wireless communication device associated with the AP attempting to transmit to the wireless communication device while the wireless communication device was in the power save mode.

Aspect 13: The wireless communication device of any one or more of aspects 1-12, where the processing system is further configured to:

obtain a header of a packet transmitted over a wireless communication medium;

enter the wireless communication device into the power save mode after processing the header, where:

a recipient address in the header does not match an address of the wireless communication device; and a length of time of the power save mode is associated with an amount of time the wireless communication medium is occupied during transmission of the packet; and wake the wireless communication device from the power save mode after the length of time, where adjusting the time period includes disabling or enabling entering the power save mode by the wireless communication device.

Aspect 14: The wireless communication device of any one or more of aspects 1-13, where the adjusted time period is between 0 milliseconds (ms) and 5 ms.

Aspect 15: The wireless communication device of any one or more of aspects 1-14, where the adjusted time period is further associated with a link quality between the wireless communication device and the AP.

Aspect 16: A method performed by an apparatus of a wireless communication device, including:

adjusting a time period to delay entering a power save mode, where the time period is associated with the wireless communication device remaining awake to prevent an access point (AP) from transmitting to the wireless communication device while the wireless communication device is in the power save mode;

providing, to the AP, an indication that the wireless communication device is entering the power save mode; and entering the power save mode upon expiration of at least the adjusted time period after providing the indication to the AP.

Aspect 17: The method of aspect 16, further including:

waking from the power save mode; and obtaining one or more physical layer protocol data units (PPDUs) from the AP after waking from the power save mode, the one or more PPDUs indicating whether the AP attempted to transmit to the wireless communication device while the wireless communication device was in the power save mode.

Aspect 18: The method of aspect 17, further including:

transmitting, to the AP, a frame with a power management field set to 1 before entering the power save mode; and transmitting, to the AP, a frame with the power management field set to 0 after waking from the power save mode.

Aspect 19: The method of aspect 17, where the indication of whether the AP attempted to transmit to the wireless communication device while the wireless communication device was in the power save mode is included in a retry field in a header of at least one of the one or more PPDUs obtained from the AP, the retry field indicating that one or more media access control (MAC) protocol data units (MPDUs) are being resent by the AP.

Aspect 20: The method of aspect 19, further including:

obtaining, from a reorder buffer of the wireless communication device, the largest sequence number of a MPDU carried in the last PPDU obtained from the AP before entering the power save mode; and obtaining, from a receive (Rx) protocol control unit (PCU) of the wireless communication device, the smallest sequence number of a MPDU carried in a first PPDU obtained from the AP after waking from the power save mode, where the adjusted time delay is associated with a difference between the smallest sequence number and the largest sequence number indicating that the MPDU from the last PPDU and the MPDU from the first PPDU are not consecutive MPDUs.

Aspect 21: The method of aspect 20, further including:

obtaining, from the Rx PCU, a first sequence number of a MPDU carried in a second PPDU obtained by the interface subsequent to obtaining the first PPDU, where the adjusted time delay is associated with the first sequence number being between the smallest sequence number and the largest sequence number.

Aspect 22: The method of aspect 21, further including obtaining a third PPDU from the AP subsequent to obtaining the first PPDU, where:

the third PPDU is obtained after an end of a block acknowledgement (BA) window associated with the first PPDU;

the second PPDU is obtained before the end of the BA window; and the adjusted time delay is not associated with sequence numbers of MPDUs in the third PPDU being between the smallest sequence number and the largest sequence number.

Aspect 23: The method of aspect 21, further including:

entering into and waking from the power save mode multiple times; and for each time the wireless communication device wakes from the power save mode:

obtaining, from the reorder buffer, the largest sequence number of a MPDU carried in the last PPDU obtained by the interface before the wireless communication device enters the power save mode; and obtaining, from the Rx PCU, the smallest sequence number of a MPDU carried in a first PPDU obtained by the interface after the wireless communication device wakes from the power save mode;

where, for a threshold number of consecutive times the wireless communication device wakes from the power save mode, the adjusted time delay is associated with a difference between the smallest sequence number and the largest sequence number indicating that the MPDU from the last PPDU and the MPDU from the first PPDU are not consecutive MPDUs.

Aspect 24: The method of any one or more of aspects 20-23, where obtaining the largest sequence number and the smallest sequence number includes obtaining a type-length-value (TLV) encoded message including the largest sequence number, the smallest sequence number, and retry field information.

Aspect 25: The method of any one or more of aspects 20-24, further including preventing the wireless communication device from entering the power save mode until a reorder buffer configured to obtain PPDUs from the AP is empty.

Aspect 26: The method of any one or more of aspects 16-25, further including periodically evaluating whether the AP attempts to transmit to the wireless communication device while the wireless communication device is in the power save mode.

Aspect 27: The method of any one or more of aspects 16-26, further including storing a basic service set identifier (BSSID) of the AP in a database of the wireless communication device associated with the AP attempting to transmit to the wireless communication device while the wireless communication device was in the power save mode.

Aspect 28: The method of any one or more of aspects 16-27, further including:
obtaining a header of a packet transmitted over a wireless communication medium;
entering into the power save mode after processing the header, where:
a recipient address in the header does not match an address of the wireless communication device; and
a length of time of the power save mode is associated with an amount of time the wireless communication medium is occupied during transmission of the packet; and
waking from the power save mode after the length of time.

Aspect 29: The method of any one or more of aspects 16-28, where the adjusted time period is further associated with a link quality between the wireless communication device and the AP.

Aspect 30: A wireless communication device, including:
means for adjusting a time period to delay entering a power save mode, where the time period is associated with the wireless communication device remaining awake to prevent an access point (AP) from transmitting to the wireless communication device while the wireless communication device is in the power save mode;
means for providing, to the AP, an indication that the wireless communication device is entering the power save mode; and
means for entering the power save mode upon expiration of at least the adjusted time period after providing the indication to the AP.

Aspect 31: The wireless communication device of aspect 30, further including:
means for waking from the power save mode; and
means for obtaining one or more physical layer protocol data units (PPDUs) from the AP after waking from the power save mode, the one or more PPDUs indicating whether the AP attempted to transmit to the wireless communication device while the wireless communication device was in the power save mode.

Aspect 32: The wireless communication device of aspect 31, further including:
means for transmitting, to the AP, a frame with a power management field set to 1 before entering the power save mode; and
means for transmitting, to the AP, a frame with the power management field set to 0 after waking from the power save mode.

Aspect 33: The wireless communication device of any one or more of aspects 31-32, where the indication of whether the AP attempted to transmit to the wireless communication device while the wireless communication device was in the power save mode is included in a retry field in a header of at least one of the one or more PPDUs obtained from the AP, the retry field indicating that one or more media access control (MAC) protocol data units (MPDUs) are being resent by the AP.

Aspect 34: The wireless communication device of aspect 33, further including:
means for obtaining, from a reorder buffer of the wireless communication device, the largest sequence number of a MPDU carried in the last PPDU obtained from the AP before entering the power save mode; and
means for obtaining, from a receive (Rx) protocol control unit (PCU) of the wireless communication device, the smallest sequence number of a MPDU carried in a first PPDU obtained from the AP after waking from the power save mode, where the adjusted time delay is associated with a difference between the smallest sequence number and the largest sequence number indicating that the MPDU from the last PPDU and the MPDU from the first PPDU are not consecutive MPDUs.

Aspect 35: The wireless communication device of aspect 34, further including:
means for obtaining, from the Rx PCU, a first sequence number of a MPDU carried in a second PPDU obtained by the interface after obtaining the first PPDU, where the adjusted time delay is associated with the first sequence number being between the smallest sequence number and the largest sequence number.

Aspect 36: The wireless communication device of aspect 35, further including means for obtaining a third PPDU from the AP after obtaining the first PPDU, where:
the third PPDU is obtained after an end of a block acknowledgement (BA) window associated with the first PPDU;
the second PPDU is obtained before the end of the BA window; and
the adjusted time delay is not associated with sequence numbers of MPDUs in the third PPDU being between the smallest sequence number and the largest sequence number.

Aspect 37: The wireless communication device of any one or more of aspects 35-36, further including:
means for entering into and waking from the power save mode multiple times; and
for each time the wireless communication device wakes from the power save mode:
means for obtaining, from the reorder buffer, the largest sequence number of a MPDU carried in the last PPDU obtained by the interface before the wireless communication device enters the power save mode; and
means for obtaining, from the Rx PCU, the smallest sequence number of a MPDU carried in a first PPDU obtained by the interface after the wireless communication device wakes from the power save mode;
where, for a threshold number of consecutive times the wireless communication device wakes from the power save mode, the adjusted time delay is associated with a difference between the smallest sequence number and the largest sequence number indicating that the MPDU from the last PPDU and the MPDU from the first PPDU are not consecutive MPDUs.

Aspect 38: The wireless communication device of any one or more of aspects 34-37, where obtaining the largest sequence number and the smallest sequence number includes obtaining a type-length-value (TLV) encoded message including the largest sequence number, the smallest sequence number, and retry field information.

Aspect 39: The wireless communication device of any one or more of aspects 30-38, further including means for preventing the wireless communication device from entering the power save mode until a reorder buffer configured to obtain PPDUs from the AP is empty.

Aspect 40: The wireless communication device of any one or more of aspects 30-39, further including means for periodically evaluating whether the AP attempts to transmit to the wireless communication device while the wireless communication device is in the power save mode.

Aspect 41: The wireless communication device of any one or more of aspects 30-40, further including means for storing a basic service set identifier (BSSID) of the AP in a database of the wireless communication device associated with the AP attempting to transmit to the wireless communication device while the wireless communication device was in the power save mode.

Aspect 42: The wireless communication device of any one or more of aspects 30-41, further including:
means for obtaining a header of a packet transmitted over a wireless communication medium;
means for entering into the power save mode after processing the header, where:
a recipient address in the header does not match an address of the wireless communication device; and
a length of time of the power save mode is associated with an amount of time the wireless communication medium is occupied during transmission of the packet; and
means for waking from the power save mode after the length of time.

Aspect 43: The wireless communication device of any one or more of aspects 30-42, where the adjusted time period is further associated with a link quality between the wireless communication device and the AP.

Aspect 44: A non-transitory, computer readable medium storing instructions that, when executed by a processing system of a wireless communication device, cause the wireless communication device to perform operations including:
adjusting a time period to delay entering a power save mode, where the time period is associated with the wireless communication device remaining awake to prevent an access point (AP) from transmitting to the wireless communication device while the wireless communication device is in the power save mode;
providing, to the AP, an indication that the wireless communication device is entering the power save mode; and
entering the wireless communication device into the power save mode upon expiration of at least the adjusted time period after providing the indication to the AP.

Aspect 45: The non-transitory, computer readable medium of aspect 44, where execution of the instructions causes the wireless communication device to perform operations further including:
waking from the power save mode; and
obtaining one or more physical layer protocol data units (PPDUs) from the AP after waking from the power save mode, the one or more PPDUs indicating whether the AP attempted to transmit to the wireless communication device while the wireless communication device was in the power save mode.

Aspect 46: The non-transitory, computer readable medium of aspect 45, where execution of the instructions causes the wireless communication device to perform operations further including:
transmitting, to the AP, a frame with a power management field set to 1 before entering the power save mode; and
transmitting, to the AP, a frame with the power management field set to 0 after waking from the power save mode.

Aspect 47: The non-transitory, computer readable medium of aspect 45, where the indication of whether the AP attempted to transmit to the wireless communication device while the wireless communication device was in the power save mode is included in a retry field in a header of at least one of the one or more PPDUs obtained from the AP, the retry field indicating that one or more media access control (MAC) protocol data units (MPDUs) are being resent by the AP.

Aspect 48: The non-transitory, computer readable medium of aspect 47, where execution of the instructions causes the wireless communication device to perform operations further including:
obtaining, from a reorder buffer of the wireless communication device, the largest sequence number of a MPDU carried in the last PPDU obtained from the AP before entering the power save mode; and
obtaining, from a receive (Rx) protocol control unit (PCU) of the wireless communication device, the smallest sequence number of a MPDU carried in a first PPDU obtained from the AP after waking from the power save mode, where the adjusted time delay is associated with a difference between the smallest sequence number and the largest sequence number indicating that the MPDU from the last PPDU and the MPDU from the first PPDU are not consecutive MPDUs.

Aspect 49: The non-transitory, computer readable medium of aspect 48, where execution of the instructions causes the wireless communication device to perform operations further including:
obtaining, from the Rx PCU, a first sequence number of a MPDU carried in a second PPDU obtained by the interface after obtaining the first PPDU, where the adjusted time delay is associated with the first sequence number being between the smallest sequence number and the largest sequence number.

Aspect 50: The non-transitory, computer readable medium of aspect 49, where execution of the instructions causes the wireless communication device to perform operations further including:
obtaining a third PPDU from the AP after obtaining the first PPDU, where:
the third PPDU is obtained after an end of a block acknowledgement (BA) window associated with the first PPDU;
the second PPDU is obtained before the end of the BA window; and
the adjusted time delay is not associated with sequence numbers of MPDUs in the third PPDU being between the smallest sequence number and the largest sequence number.

Aspect 51: The non-transitory, computer readable medium of any one or more of aspects 49-50, where execution of the instructions causes the wireless communication device to perform operations further including:
entering into and waking from the power save mode multiple times; and
for each time the wireless communication device wakes from the power save mode:
obtaining, from the reorder buffer, the largest sequence number of a MPDU carried in the last PPDU obtained by the interface before the wireless communication device enters the power save mode; and obtaining, from the Rx PCU, the smallest sequence number of a MPDU carried in a first PPDU obtained by the interface after the wireless communication device wakes from the power save mode;

where, for a threshold number of consecutive times the wireless communication device wakes from the power save mode, the adjusted time delay is associated with a difference between the smallest sequence number and the largest sequence number indicating that the MPDU from the last PPDU and the MPDU from the first PPDU are not consecutive MPDUs.

Aspect 52: The non-transitory, computer readable medium of any one or more of aspects 48-51, where obtaining the largest sequence number and the smallest sequence number includes obtaining a type-length-value (TLV) encoded message including the largest sequence number, the smallest sequence number, and retry field information.

Aspect 53: The non-transitory, computer readable medium of any one or more of aspects 44-52, where execution of the instructions causes the wireless communication device to perform operations further including preventing the wireless communication device from entering the power save mode until a reorder buffer configured to obtain PPDUs from the AP is empty.

Aspect 54: The non-transitory, computer readable medium of any one or more of aspects 44-53, where execution of the instructions causes the wireless communication device to perform operations further including periodically evaluating whether the AP attempts to transmit to the wireless communication device while the wireless communication device is in the power save mode.

Aspect 55: The non-transitory, computer readable medium of any one or more of aspects 44-54, where execution of the instructions causes the wireless communication device to perform operations further including storing a basic service set identifier (BSSID) of the AP in a database of the wireless communication device associated with the AP attempting to transmit to the wireless communication device while the wireless communication device was in the power save mode.

Aspect 56: The non-transitory, computer readable medium of any one or more of aspects 44-55, where execution of the instructions causes the wireless communication device to perform operations further including:

obtaining a header of a packet transmitted over a wireless communication medium;

entering into the power save mode after processing the header, where:

a recipient address in the header does not match an address of the wireless communication device; and a length of time of the power save mode is associated with an amount of time the wireless communication medium is occupied during transmission of the packet; and waking from the power save mode after the length of time.

Aspect 57: The non-transitory, computer readable medium of anyone or more of aspects 44-56, where the adjusted time period is further associated with a link quality between the wireless communication device and the AP.

Aspect 58: A wireless communication device, including
a processing system configured to:
enable a packet-power save (PPS) mode during which the wireless communication device is configured to enter a nap state in association with receiving frames not addressed to the wireless communication device; and
an interface configured to:
receive at least a header of a frame transmitted on a wireless channel from an access point (AP); and
obtain an indication that the frame is not addressed to the wireless communication device; and
the processing system further configured to:
enter the wireless communication device into the nap state in association with the obtained indication;
obtain, after an end of the nap state, an indication that the AP transmitted one or more frames to the wireless communication during the nap state; and
disable the PPS mode in association with the indication that the AP transmitted one or more frames to the wireless communication device during the nap state.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wireless communication device, comprising:
  a processing system configured to:
    adjust a time period associated with delaying entry into a power save mode, wherein the time period is associated with the wireless communication device remaining awake to prevent an access point (AP) from transmitting to the wireless communication device while the wireless communication device is in the power save mode; and
  an interface configured to:
    provide, to the AP, an indication that the wireless communication device is entering the power save mode; and
  the processing system is further configured to:
    enter the wireless communication device into the power save mode upon expiration of at least the adjusted time period after providing the indication to the AP; and
    wake the wireless communication device from the power save mode; and
  the interface is further configured to:
    obtain one or more physical layer protocol data units (PPDUs) from the AP after waking from the power save mode, the one or more PPDUs indicating whether the AP attempted to transmit to the wireless communication device while the wireless communication device was in the power save mode, wherein the indication of whether the AP attempted to transmit to the wireless communication device while the wireless communication device was in the power save mode is included in a retry field in a header of at least one of the one or more PPDUs obtained from the AP, the retry field indicating that one or more media access control (MAC) protocol data units (MPDUs) are being resent by the AP.

2. The wireless communication device of claim 1, wherein the indication comprises a Notification frame signaling an intention of the wireless communication device to enter the power save mode.

3. The wireless communication device of claim 1, wherein the processing system is further configured to:
  obtain, from a reorder buffer of the wireless communication device, a largest sequence number of a MPDU carried in a last PPDU obtained from the AP before entering the power save mode; and
  obtain, from a receive (Rx) protocol control unit (PCU) of the wireless communication device, a smallest sequence number of a MPDU carried in a first PPDU obtained from the AP after waking from the power save mode, wherein the adjusted time delay is associated with a difference between the smallest sequence number and the largest sequence number indicating that the MPDU carried in the last PPDU and the MPDU carried in the first PPDU are not consecutively obtained MPDUs.

4. The wireless communication device of claim 3, wherein the processing system is further configured to:
  obtain, from the Rx PCU, a first sequence number of a MPDU carried in a second PPDU obtained by the interface subsequent to obtaining the first PPDU, wherein the adjusted time delay is associated with the first sequence number being between the smallest sequence number and the largest sequence number.

5. The wireless communication device of claim 4, wherein the interface is further configured to obtain a third PPDU from the AP subsequent to obtaining the first PPDU, wherein:
the third PPDU is obtained after an end of a block acknowledgement (BA) window associated with the first PPDU;
the second PPDU is obtained before the end of the BA window; and
the adjusted time delay is not associated with sequence numbers of MPDUs in the third PPDU being between the smallest sequence number and the largest sequence number.

6. The wireless communication device of claim 3, wherein the processing system is further configured to:
enter the wireless communication device into the power save mode and wake the wireless communication device from the power save mode multiple times; and
for each time the wireless communication device wakes from the power save mode:
obtain, from the reorder buffer, the largest sequence number of a MPDU carried in the last PPDU obtained by the interface before the wireless communication device enters the power save mode; and
obtain, from the Rx PCU, the smallest sequence number of a MPDU carried in a first PPDU obtained by the interface after the wireless communication device wakes from the power save mode,
wherein for a threshold number of consecutive times the wireless communication device wakes from the power save mode, the adjusted time delay is associated with a difference between the smallest sequence number and the largest sequence number indicating that the MPDU carried in the last PPDU and the MPDU carried in the first PPDU are not consecutively obtained MPDUs.

7. The wireless communication device of claim 1, wherein entering the power save mode is associated with receiving, from the AP, an acknowledgement of obtaining the indication.

8. A method performed by an apparatus of a wireless communication device, comprising:
adjusting a time period associated with delaying entry into a power save mode, wherein the time period is associated with the wireless communication device remaining awake to prevent an access point (AP) from transmitting to the wireless communication device while the wireless communication device is in the power save mode;
providing, to the AP, an indication that the wireless communication device is entering the power save mode;
entering the power save mode upon expiration of at least the adjusted time period after providing the indication to the AP;
waking from the power save mode; and
obtaining one or more physical layer protocol data units (PPDUs) from the AP after waking from the power save mode, the one or more PPDUs indicating whether the AP attempted to transmit to the wireless communication device while the wireless communication device was in the power save mode, wherein the indication of whether the AP attempted to transmit to the wireless communication device while the wireless communication device was in the power save mode is included in a retry field in a header of at least one of the one or more PPDUs obtained from the AP, the retry field indicating that one or more media access control (MAC) protocol data units (MPDUs) are being resent by the AP.

9. The method of claim 8, wherein the indication comprises a Notification frame signaling an intention of the wireless communication device to enter the power save mode.

10. The method of claim 8, further comprising:
obtaining, from a reorder buffer of the wireless communication device, a largest sequence number of a MPDU carried in a last PPDU obtained from the AP before entering the power save mode; and
obtaining, from a receive (Rx) protocol control unit (PCU) of the wireless communication device, a smallest sequence number of a MPDU carried in a first PPDU obtained from the AP after waking from the power save mode, wherein the adjusted time delay is associated with a difference between the smallest sequence number and the largest sequence number indicating that the MPDU carried in the last PPDU and the MPDU carried in the first PPDU are not consecutively obtained MPDUs.

11. The method of claim 10, further comprising:
obtaining, from the Rx PCU, a first sequence number of a MPDU carried in a second PPDU obtained by an interface of a wireless communication device subsequent to obtaining the first PPDU, wherein the adjusted time delay is associated with the first sequence number being between the smallest sequence number and the largest sequence number.

12. The method of claim 11, further comprising obtaining a third PPDU from the AP subsequent to obtaining the first PPDU, wherein:
the third PPDU is obtained after an end of a block acknowledgement (BA) window associated with the first PPDU;
the second PPDU is obtained before the end of the BA window; and
the adjusted time delay is not associated with sequence numbers of MPDUs in the third PPDU being between the smallest sequence number and the largest sequence number.

13. The method of claim 10, further comprising:
entering into and waking from the power save mode multiple times; and
for each time the wireless communication device wakes from the power save mode:
obtaining, from the reorder buffer, the largest sequence number of a MPDU carried in the last PPDU obtained by the interface before the wireless communication device enters the power save mode; and
obtaining, from the Rx PCU, the smallest sequence number of a MPDU carried in a first PPDU obtained by the interface after the wireless communication device wakes from the power save mode,
wherein for a threshold number of consecutive times the wireless communication device wakes from the power save mode, the adjusted time delay is associated with a difference between the smallest sequence number and the largest sequence number indicating that the MPDU carried in the last PPDU and the MPDU carried in the first PPDU are not consecutively obtained MPDUs.

14. The method of claim 8, wherein entering the power save mode is associated with receiving, from the AP, an acknowledgement of obtaining the indication.

15. The method of claim 8, further comprising preventing the wireless communication device from entering the power save mode until a reorder buffer configured to obtain PPDUs from the AP is empty.

16. The method of claim 8, further comprising periodically evaluating whether the AP attempts to transmit to the wireless communication device while the wireless communication device is in the power save mode.

17. The method of claim 8, further comprising storing a basic service set identifier (BSSID) of the AP in a database of the wireless communication device associated with the AP attempting to transmit to the wireless communication device while the wireless communication device was in the power save mode.

18. The method of claim 8, further comprising:
obtaining a header of a packet transmitted over a wireless communication medium;
entering into the power save mode after processing the header, wherein:
a recipient address in the header does not match an address of the wireless communication device; and
a length of time of the power save mode is associated with an amount of time the wireless communication medium is occupied during transmission of the packet; and
waking from the power save mode after the length of time.

19. A wireless communication device, comprising:
means for adjusting a time period associated with delaying entry into a power save mode, wherein the time period is associated with the wireless communication device remaining awake to prevent an access point (AP) from transmitting to the wireless communication device while the wireless communication device is in the power save mode;
means for providing, to the AP, an indication that the wireless communication device is entering the power save mode;
means for entering the power save mode upon expiration of at least the adjusted time period after providing the indication to the AP;
means for waking the wireless communication device from the power save mode; and
means for obtaining one or more physical layer protocol data units (PPDUs) from the AP after waking from the power save mode, the one or more PPDUs indicating whether the AP attempted to transmit to the wireless communication device while the wireless communication device was in the power save mode, wherein the indication of whether the AP attempted to transmit to the wireless communication device while the wireless communication device was in the power save mode is included in a retry field in a header of at least one of the one or more PPDUs obtained from the AP, the retry field indicating that one or more media access control (MAC) protocol data units (MPDUs) are being resent by the AP.

20. A non-transitory, computer readable medium storing instructions that, when executed by a processing system of a wireless communication device, cause the wireless communication device to perform operations including:
adjusting a time period associated with delaying entry into a power save mode, wherein the time period is associated with the wireless communication device remaining awake to prevent an access point (AP) from transmitting to the wireless communication device while the wireless communication device is in the power save mode;
providing, to the AP, an indication that the wireless communication device is entering the power save mode;
entering the wireless communication device into the power save mode upon expiration of at least the adjusted time period after providing the indication to the AP;
waking from the power save mode; and
obtaining one or more physical layer protocol data units (PPDUs) from the AP after waking from the power save mode, the one or more PPDUs indicating whether the AP attempted to transmit to the wireless communication device while the wireless communication device was in the power save mode, wherein the indication of whether the AP attempted to transmit to the wireless communication device while the wireless communication device was in the power save mode is included in a retry field in a header of at least one of the one or more PPDUs obtained from the AP, the retry field indicating that one or more media access control (MAC) protocol data units (MPDUs) are being resent by the AP.

21. The wireless communication device of claim 19, further comprising:
means for obtaining, from a reorder buffer of the wireless communication device, a largest sequence number of a MPDU carried in a last PPDU obtained from the AP before entering the power save mode; and
means for obtaining, from a receive (Rx) protocol control unit (PCU) of the wireless communication device, a smallest sequence number of a MPDU carried in a first PPDU obtained from the AP after waking from the power save mode, wherein the adjusted time delay is associated with a difference between the smallest sequence number and the largest sequence number indicating that the MPDU carried in the last PPDU and the MPDU carried in the first PPDU are not consecutively obtained MPDUs.

22. The non-transitory, computer readable medium of claim 20, wherein the indication comprises a Notification frame signaling an intention of the wireless communication device to enter the power save mode.

23. The non-transitory, computer readable medium of claim 20, wherein entering the power save mode is associated with receiving, from the AP, an acknowledgement of obtaining the indication.

* * * * *